(12) United States Patent
Gallagher et al.

(10) Patent No.: US 10,005,422 B2
(45) Date of Patent: Jun. 26, 2018

(54) SIDE SEAT AND SWIVEL RESTRAINT SYSTEM

(71) Applicants: Kevin Gallagher, Phoenix, AZ (US); Dan Sjoquist, Cave Creek, AZ (US)

(72) Inventors: Kevin Gallagher, Phoenix, AZ (US); Dan Sjoquist, Cave Creek, AZ (US)

( * ) Notice: Subject to any disclaimer, the term of this patent is extended or adjusted under 35 U.S.C. 154(b) by 0 days. days.

(21) Appl. No.: 14/825,047

(22) Filed: Aug. 12, 2015

(65) Prior Publication Data
US 2017/0043688 A1 Feb. 16, 2017

(51) Int. Cl.
| | |
|---|---|
| *B60R 22/26* | (2006.01) |
| *B60N 2/14* | (2006.01) |
| *B60N 2/68* | (2006.01) |
| *B60N 2/06* | (2006.01) |
| *B60N 2/20* | (2006.01) |
| *A61G 3/00* | (2006.01) |
| *B60N 2/42* | (2006.01) |
| *B60N 2/427* | (2006.01) |

(52) U.S. Cl.
CPC .............. *B60R 22/26* (2013.01); *A61G 3/003* (2013.01); *B60N 2/06* (2013.01); *B60N 2/14* (2013.01); *B60N 2/146* (2013.01); *B60N 2/206* (2013.01); *B60N 2/688* (2013.01); *A61G 3/006* (2013.01); *B60N 2/4221* (2013.01); *B60N 2/42736* (2013.01)

(58) Field of Classification Search
CPC .......... B60R 22/26; A61G 3/003; B60N 2/06; B60N 2/14; B60N 2/146; B60N 2/206; B60N 2/688; B60N 2/4221; B60N 2/42736

USPC .... 297/344.22, 474, 216.17, 216.18, 216.19, 297/216.2
See application file for complete search history.

(56) References Cited

U.S. PATENT DOCUMENTS

| | | | | |
|---|---|---|---|---|
| 2,777,531 | A * | 1/1957 | Erickson | B60N 2/4221 180/270 |
| 4,251,100 | A | 2/1981 | Rolandelli | |
| 5,120,103 | A | 6/1992 | Kave | |
| 5,328,234 | A * | 7/1994 | Daniel | B60N 2/4235 296/68.1 |
| 5,615,848 | A | 4/1997 | Ceriani | |
| 5,857,744 | A * | 1/1999 | LaPointe | A47C 3/18 297/259.2 |
| 6,767,057 | B2 | 7/2004 | Neelis | |
| 2007/0158969 | A1 | 7/2007 | Walkingshaw | |
| 2008/0036232 | A1 | 2/2008 | Randjelovic et al. | |
| 2008/0265643 | A1* | 10/2008 | Haas | B60N 2/203 297/353 |
| 2011/0049951 | A1* | 3/2011 | Bettencourt | A47C 31/11 297/229 |
| 2014/0167469 | A1* | 6/2014 | Haller | B60N 2/06 297/344.12 |

* cited by examiner

Primary Examiner — Syed A Islam
(74) Attorney, Agent, or Firm — VenJuris, P.C.

(57) ABSTRACT

A sideseat includes a sideseat base, turntable, posterior frame and backrest frame. The sideseat posterior frame is rotatably coupled to the sideseat base through the turntable. The turntable is positioned so that the sideseat turntable and combined frame components move from a deployed position to a locked position in response to an applied force.

16 Claims, 21 Drawing Sheets

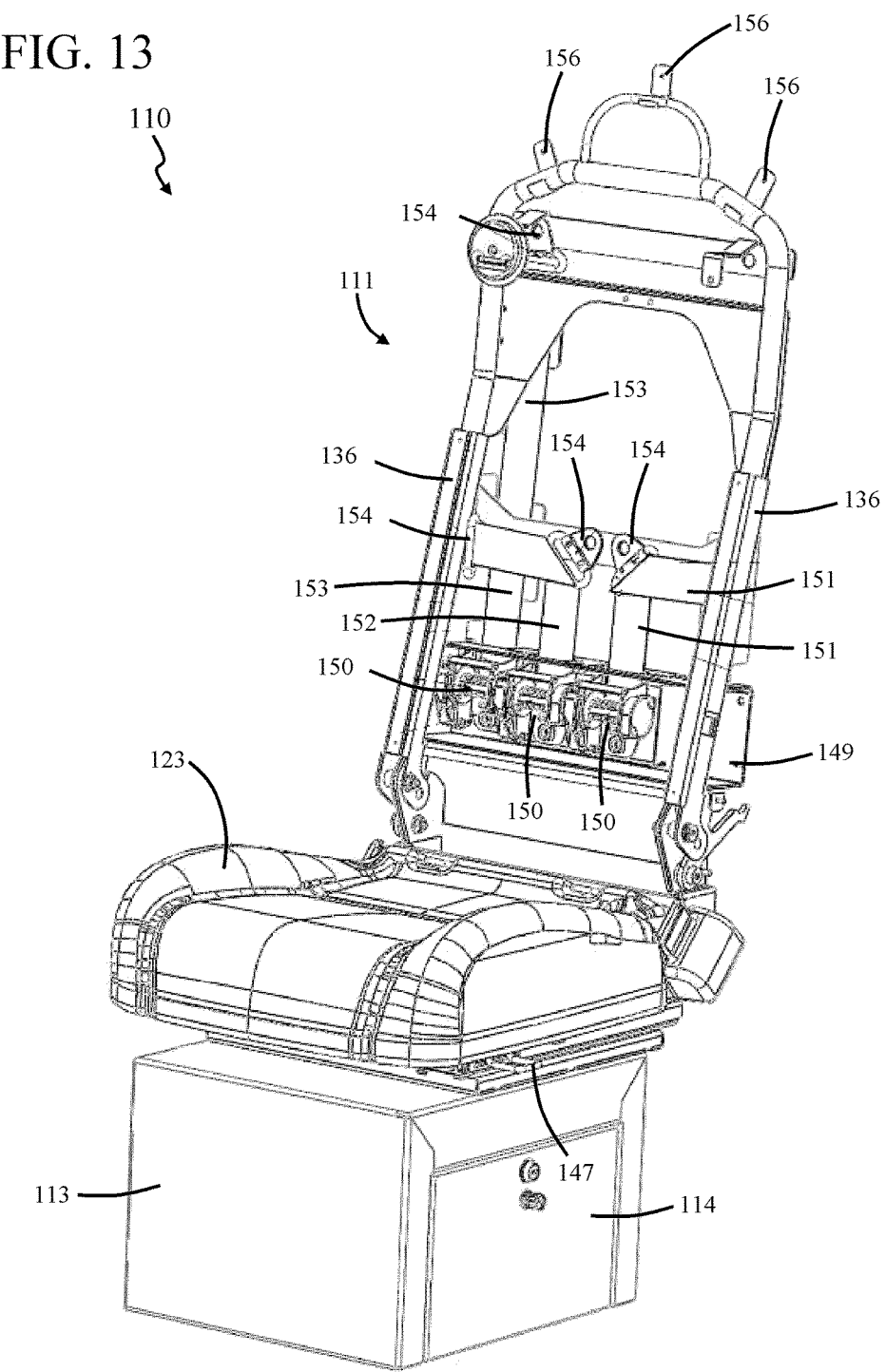

SIDE SEAT AND SWIVEL RESTRAINT SYSTEM

CROSS-REFERENCE TO RELATED APPLICATIONS

This application claims priority to U.S. Provisional Application No. 62/036,220, which was filed on Aug. 12, 2014, the contents of which are incorporated by reference as though fully set forth herein.

BACKGROUND OF THE INVENTION

Description of the Related Art

There are many different types of ambulances available for transporting people. Examples of ambulances are disclosed in U.S. Pat. Nos. 4,251,100, 5,120,103, 5,615,848 and 6,043,287, as well as in U.S. Patent Application Nos. 2007/0158969 and 2008/0036232, the contents of all of which are incorporated by reference as though fully set forth herein.

These ambulances provide many different seating arrangements for transporting people. For example, a typical ambulance includes a paramedic ambulance seat positioned at the head of a stretcher. The paramedic ambulance seat is positioned so that the paramedic sitting in it can monitor a patient carried by a stretcher, as well as operate the equipment included with the ambulance.

A typical ambulance also includes seating along its side. The side seating allows the paramedic to sit at the side of the stretcher and work on the patient carried by the stretcher. However, it is known that injuries often occur to people sitting on the side seat in response to the ambulance coming to a sudden stop, such as when the ambulance is in an accident.

All vehicle types with side facing seating share one thing in common, seats that are contrary to what both practical experience and empirical data have shown to be safe in passenger vehicles. Side facing seats are well documented to result in substantial increases in passenger injury compared to forward facing seats. Used in a side facing position, most common seats and restraints are outside of their original design, engineering and testing parameters since they are designed for forward facing use in compliance with the Federal Motor Vehicle Safety Standards. There is currently no applicable section of the Federal Motor Vehicle Safety Standards relating to seating and restraints in the rear compartments of ambulances, military and other specialty vehicles. A recent study published by the FAA in July of 2011 "Neck Injury Criteria for Side Facing Aircraft Seats" provided the latest validation of the fact that side facing seats create dangerous neck loading.

Taking a closer look at ambulances as an example provides a clear illustration of the problem. Of the seating positions that are typically available in most ambulances in the United States, side facing seats are by far the most common. These seats can be very versatile, and offer the best access to the patient. They also represent some unique and serious hazards to the attendant seated in them that are not addressed by any seat and restraint systems currently available.

Ambulance crash data available from the CDC shows that 79% of ambulance crashes are from the front of the vehicle. Impacts from this direction can result in severe lateral loads being placed on both passengers and harness systems in side facing seats and restraints. One of the most serious problems is the potential for severe neck injury caused by impingement of the cervical region by the over the shoulder belt that is toward the direction of impact. The acute lateral loading also results in the belt retractors that are integral to both lap belts and harness systems deploying at a much more severe angle than they are designed for. That can result in retarded retractor locking and allow the passenger's body to travel excessively beyond acceptable limits for proper function of the restraint system.

Typical vehicle seats with integrated seat belts have the retractors for the restraint system mounted on the base or lower frame due to the greater structural strength found in those components. While it is possible for this design to function well in a seat with a fixed back, it can create problems in a seat with a folding back because of the extra belt travel required for the seat to fold. This can directly impede the seats ability to fold and also interfere with the retractors ability to lock when loaded.

Typical vehicle seat upholstery consists of a metal, wood or plastic frame/substructure. A soft open cell foam pad is placed on top of the substructure and covered either by a vinyl coated fabric or leather. This type of construction represents several problems for seats in service, military and emergency vehicles. Seats in those vehicles are typically heavily used, and may need to accommodate passengers that are wearing a variety of tools and implements that can cause significant abrasions, tears and punctures. They also commonly require frequent cleaning using industrial cleaning agents and disinfectants. In the case of military and emergency vehicles, they may be exposed to body fluids and blood borne pathogens. In the case of any damage, conventional vehicle upholstery is difficult to repair in the field. Any fluids that penetrate either external damage or stitching in a sewn seam are readily absorbed by the open cell foam providing a breeding ground for pathogens. Replacing conventional upholstery is typically an expensive and time consuming process necessitating the removal of the complete seat from the vehicle. If a replacement seat is not readily available this may take the entire vehicle out of service reducing the capabilities of the agency involved.

In emergency and military vehicles it is sometimes necessary to transport more than one patient in a supine position. While some other seats may fold and allow a back board or cot to lie on top, they are not designed for that purpose and may not be capable of supporting the weight of a patient without some other part of the vehicle bearing a portion of the load. They may also rely on the same seat belt that a regular sitting passenger would use as the sole method of restraint. This can result in excessive and dangerous movement and instability of the cot or back board.

One of the most difficult challenges for emergency vehicles is transporting children. In most ambulances, removable car seats that are commonly used in passenger vehicles may not be safely used due to the side and rear facing seats in the passenger compartment. In the United Sates, passenger car child seats are designed and tested to meet Federal Motor Vehicle Safety Standard (FMVSS) 213. FMVSS 213 is specifically for forward facing passenger seats, and there is no requirement or accommodation for testing side or rear facing seats. If the emergency personnel attempt to use a seat designed and tested for a forward facing installation in a side or rear facing seat they are conducting an unplanned and potentially very dangerous experiment with the child as an unwilling participant. Another concern in emergency vehicles is the wide variety of non-standard belt and harness systems found in ambulance seats. It can be very difficult and time consuming to configure them to safely attach a child seat designed for passenger vehicles, and time is commonly at a premium in an emergency transport.

Accordingly, there is a need to side seating which reduces the likelihood of injuries when the ambulance comes to a sudden stop.

BRIEF SUMMARY OF THE INVENTION

A seat and restraint system specifically designed to address the unique problems of restraining passengers in vehicles where passengers can face forward (toward the front of the vehicle) while the vehicle is in motion for optimum safety but still need to periodically turn toward the center of the vehicle to accomplish a task. As documented in the Description of the Related Art, side facing seats dramatically increase the risk of passenger morbidity and mortality. The goal of this invention is to safely return the passenger to a forward facing position in the event of a collision. This is achieved by the interaction of the seat section and harness section to allow the overall seating system to return to a forward facing and locked position in response to forces generated by an impact to the front of the vehicle. This requires that the seat and harness systems be designed for a specific installation orientation in order to function correctly and they are not interchangeable between the left and right sides of the vehicle The seat has a turntable and swivel system designed to only lock in the forward facing position. This is the optimum position for passenger safety while the vehicle is in motion. If the swivel lock is disengaged then the seat may be swiveled toward the centerline of the vehicle and is restricted to less than 90° of travel. At the limit of the swivel excursion the seat will not lock in place and remains free to move. The exact degree of the allowed swivel excursion may vary and is calculated to ensure that the seat returns to a forward and locked position during a frontal crash or rapid deceleration. The ability to swivel from the forward and locked position is confined to a single direction and any other movement is restricted. Due to this lateral restriction the seats are built to be either left or right side mounting only, thus a vehicle with seats on both sides would require mirror images and not exact duplicates.

Due to the directional and asymmetric nature of the harness design, there is no leading (toward the front of the vehicle) over the shoulder strap to interfere with the deceleration of the neck and cervical spine. This eliminates the potential injury caused by that strap impinging on the neck during a crash. The bilateral torso straps restrain the trunk and minimize thoracic excursion, while the trailing shoulder strap and chest strap combine to restrain the trailing shoulder and minimize thoracic twisting and lumbar loading. They attach to either ALR (Automatic Locking Refractor) or locking latchplate lap belts which anchor the thoracic harness system and provide pre-crash locked restraint for the pelvis. The harness adjustment strap anchored by the lap belt system tightens in opposition to the trailing shoulder strap to allow the rotary buckle to be correctly positioned on the chest. An optional adjustable crotch strap provides downward traction and support to the harness while restricting lateral movement of the lower extremities.

An additional design goal is to provide a means for the safe transportation of infants and children. This is accomplished by allowing the safe installation of conventional infant and child seats designed for passenger vehicles when the seat is locked in the forward facing position. The seat has integrated lower anchors and a top tether attachment point that is compatible with the passenger vehicle LATCH standards and allows for an installation similar to what would be found in a standard passenger vehicle.

BRIEF DESCRIPTION OF THE DRAWINGS

It should be noted that like reference characters are used throughout the several views of the drawings.

FIG. 6b is a perspective view of a sideseat posterior cushion, which is carried by the sideseat posterior frame of FIG. 6a;

FIG. 13 is a perspective front of the sideseat of FIG. 11 showing an integrated refractor and restraint system and internal retractors.

Figure 1A:
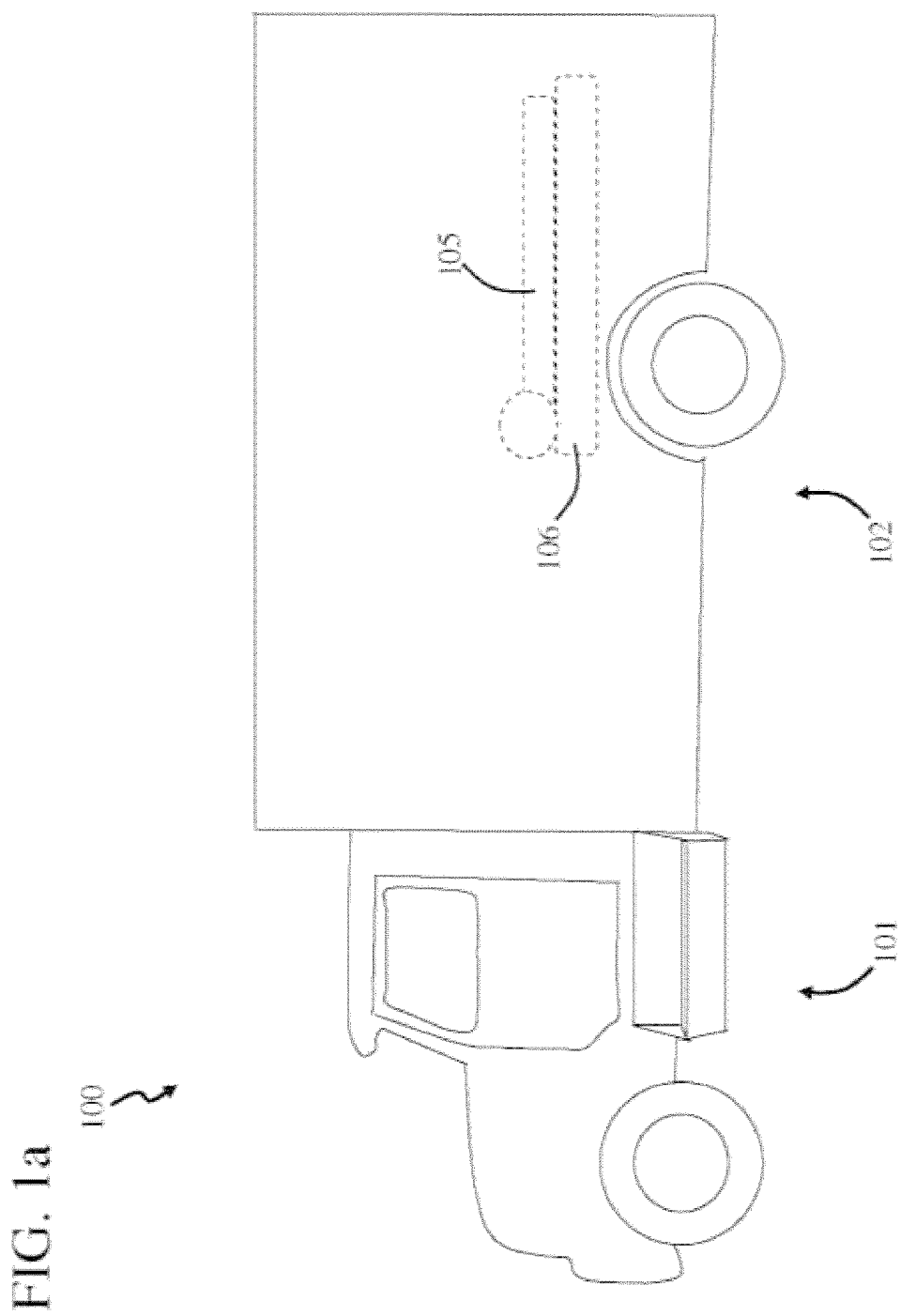
FIGS. 1a and 1b are side and top views, respectively, of a vehicle which carries a sideseat.

COMPONENT LEGEND FOR THE DRAWINGS vehicle 100
vehicle cab 101
stretcher compartment 102
stretcher compartment sidewall 103
stretcher compartment side seat region 104
person 105
stretcher 106
midline 107
installed sideseat 109
sideseat 110
sideseat backrest frame 111
sideseat posterior frame 112 sideseat base 113
sideseat base door 114
locking mechanism 115
sideseat base opening 117
upper sideseat base wall 118
folding bracket assembly 119
folding bracket cross-bar 120
folding bracket 121
sideseat backrest cushion 122
sideseat posterior cushion 123
turntable 125
upper slide rails 126
folding support bracket 127
posterior frame supports 128
lower slide rail 129
support plate 130
backrest support rail 131
upper frame member 136
lower backrest plate 138
upper backrest plate 139
stop pins 140 and 141
stop pins 140 and 141
protrusion 142
notch 143
notch 144
child seat anchor bracket 145
upper tether attachment bracket 146
backboard strap attachment bar 147
integrated retractor housing 149
emergency locking retractor 150
leading side torso belt 151
trailing side torso belt 152
trailing side shoulder belt 153
90° belt re-director 154
backrest cushion frame opening 155
backrest tab 156
posterior cushion frame opening 157
posterior tab 158
sideseat backrest cushion frame 159
upper tether 160
tether sidewall mounting bracket 161
anchor bracket latch assembly 165
sidewall mounting bracket 166
latch arm 167
latch 168

DETAILED DESCRIPTION OF THE INVENTION

Figure 1B:
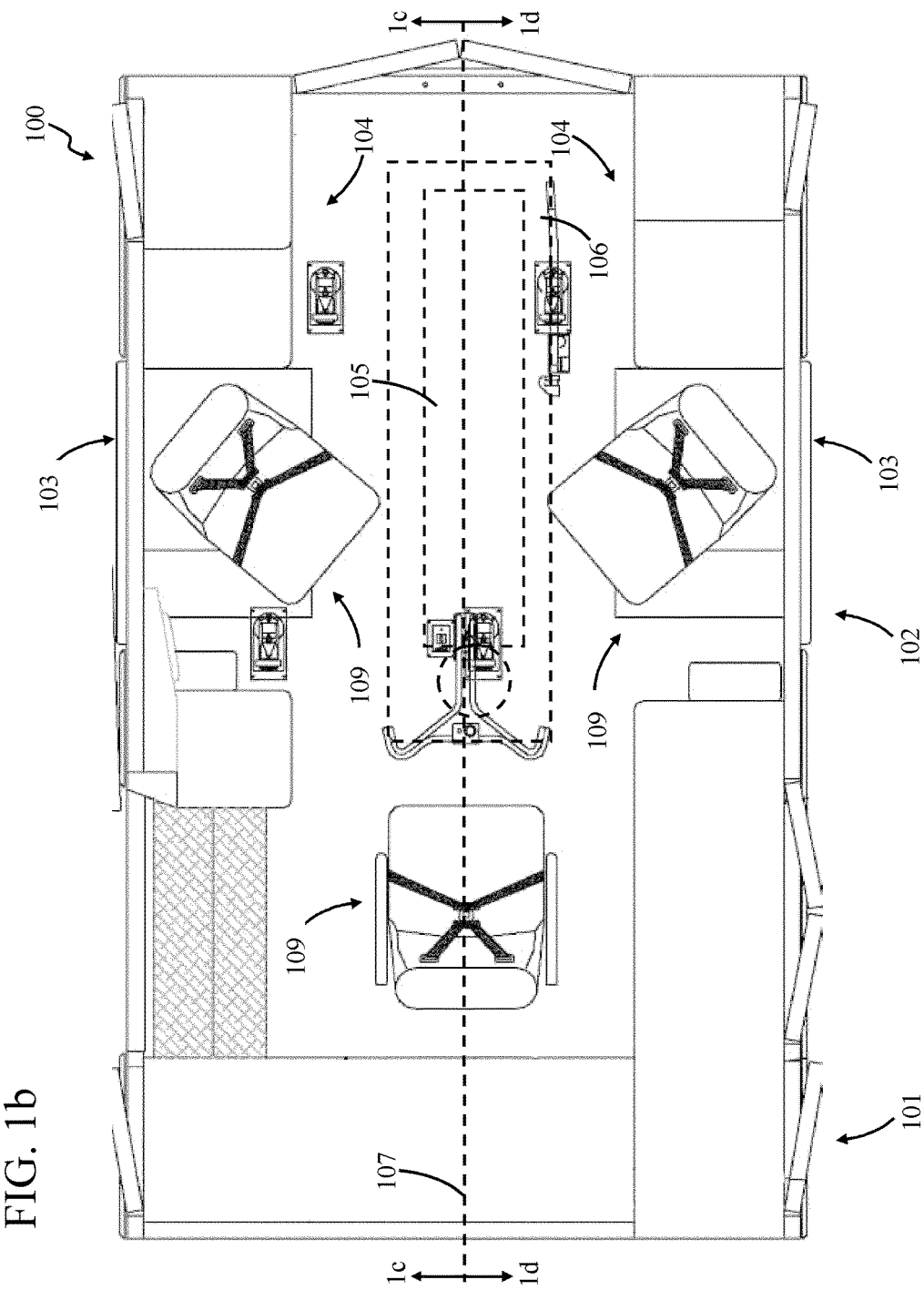
Figure 1C:
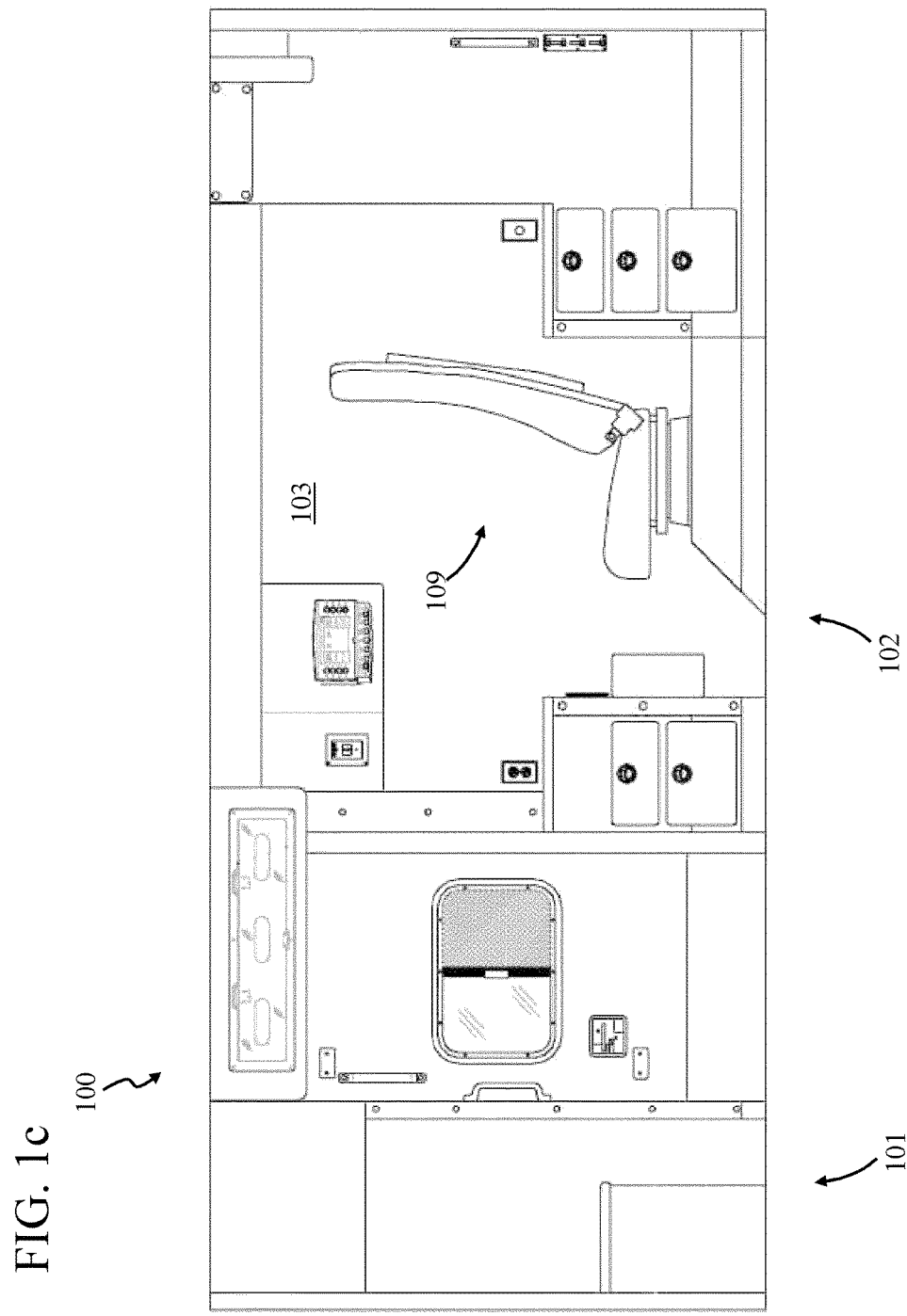
FIGS. 1c and 1d are opposed side views of the vehicle of FIGS. 1a and 1b.
Figure 1D:
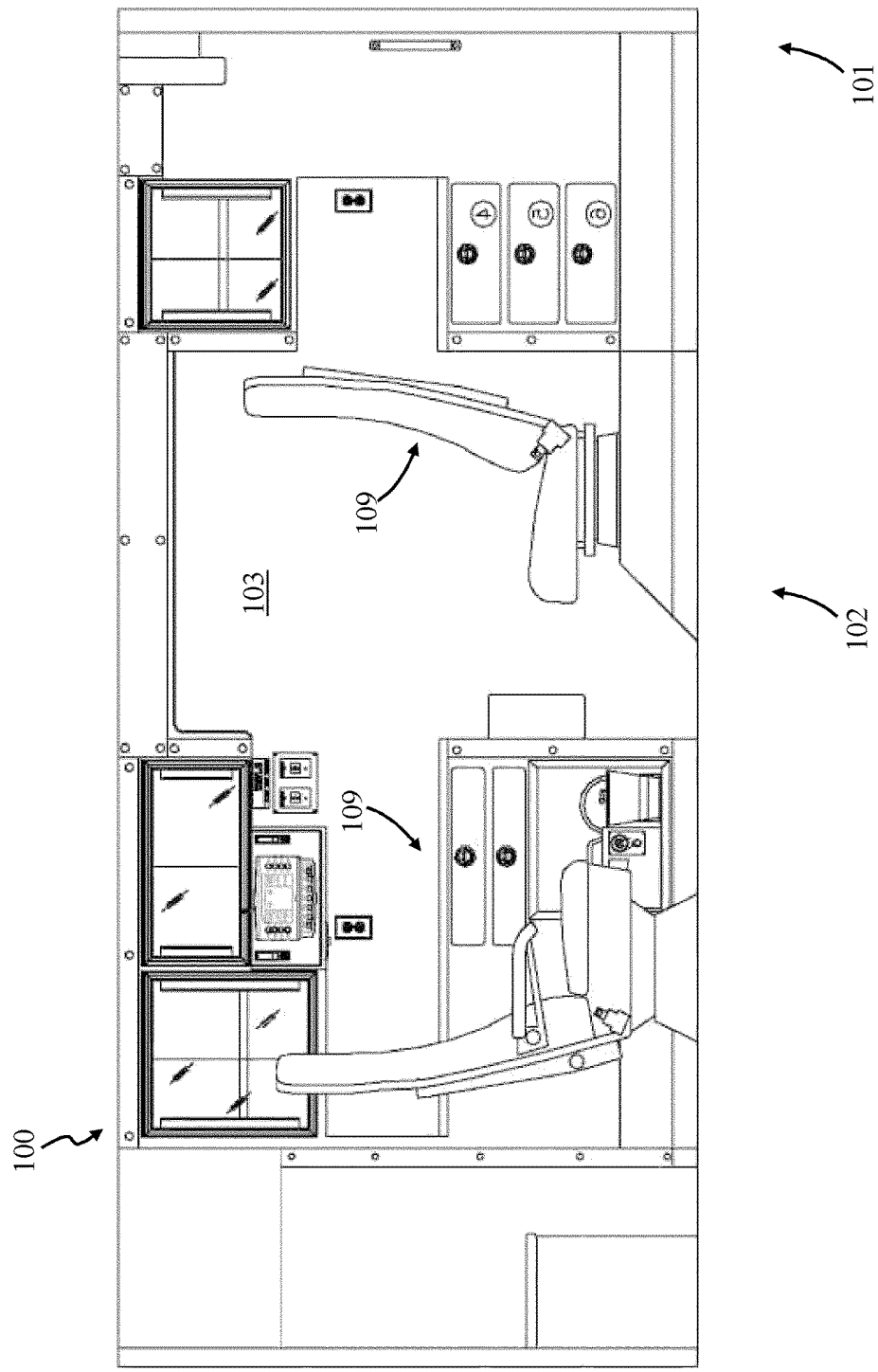

FIGS. 1*a* and 1*b* are side and top views, respectively, of a vehicle 100, and FIGS. 1*c* and 1*d* are opposed side views of the vehicle of FIGS. 1*a* and 1*b*. It should be noted that the view of FIG. 1*c* is in a direction indicated by a cut-line 1*c*-1*c* of FIG. 1*b*, and the view of FIG. 1*d* is in a direction indicated by a cut-line 1*d*-1*d* of FIG. 1*b*.

In this embodiment, vehicle 100 includes a vehicle cab 101 positioned at the front of said vehicle cab 100, and a stretcher compartment 102 positioned at the rear of said vehicle 100. In this embodiment, stretcher compartment 102 includes stretcher compartment sidewalls 103 (FIGS. 1*c* and 1*d*), which extend longitudinally along vehicle 100.

In this embodiment, stretcher compartment 102 includes at least one stretcher compartment side seat region 104 (FIG. 1*b*). In an example embodiment, one stretcher compartment side seat region 104 is positioned between a stretcher compartment sidewall 103 and a midline 107 of vehicle 100, and one stretcher compartment side seat region 104 is positioned between another stretcher compartment sidewall 103 and midline 107. Midline 107 extends longitudinally from front to back of vehicle 100. Midline 107 extends along a centerline of vehicle 100. In this embodiment, the stretcher compartment side seat regions 104 are spaced apart from each other so that a stretcher 106 can be positioned between each stretcher compartment side seat region 104. Stretcher 106 is for carrying a person 105 in a well-known manner. It should be noted that person 105 and stretcher 106 are shown in phantom in FIG. 1*b*.

It is desirable to provide seating in stretcher compartment 102 proximate to stretcher 106. For example, in some instances, it is desirable to provide seating in stretcher compartment side seat regions 104 so that a person can sit proximate to a side of stretcher 106. As indicated in FIGS. 1*b* and 1*d*, an installed side seat 109 can be positioned in stretcher compartment side seat region 104. Further, as indicated in FIGS. 1*b* and 1*c*, additional installed side seats 109 can be positioned in additional stretcher compartment side seat regions 104. In some instances, it is desirable to provide seating proximate to the head of person 105. In these instances, and as indicated in FIGS. 1*b* and 1*d*, an additional installed side seat 109 can be positioned proximate to the front of the vehicle 100.

FIGS. 2*a*-2*f* are various views of one embodiment of a sideseat 110 for use with vehicle 100. It should be noted that sideseat 110 can be used as an installed side seat 109. In this embodiment, vehicle 100 includes sideseat 110, which can be positioned at many different locations. In this embodiment, sideseat 110 is positioned in stretcher compartment 102. Sideseat 110 can be positioned at many different locations in stretcher compartment 102. In some embodiments, sideseat 110 is positioned in stretcher compartment side seat region 104 and installed as an installed side seat 109. In this embodiment, sideseat 110 is positioned in stretcher compartment side seat region 104.

In some embodiments, vehicle 100 includes more than one sideseat 110. In these embodiments, vehicle 100 includes one sideseat 110 positioned in one stretcher compartment side seat region 104 and another sideseat 110 positioned in stretcher compartment side seat region 104. In this way, vehicle 100 includes two sideseats 110. It should be noted that, in general, vehicle 100 can include one or more sideseats.

Sideseat 110 is repeatably moveable between a locked and deployed position. In the locked position, sideseat 110 faces toward the front of vehicle 100 and, in the deployed position, sideseat 110 faces toward the midline 107 of vehicle 100. Sideseat 110 moves from the deployed position to the locked position in response to a force applied to vehicle 100. The force can be applied to vehicle 100 in many different ways. For example, in some situations, the force is applied to vehicle 100 in response to vehicle 100 being in an accident. In some situations, the force is applied to vehicle 100 in response to vehicle 100 stopping suddenly. The force is often applied to vehicle 100 in response to vehicle 100 hitting an object, such as another vehicle.

Figure 2A:
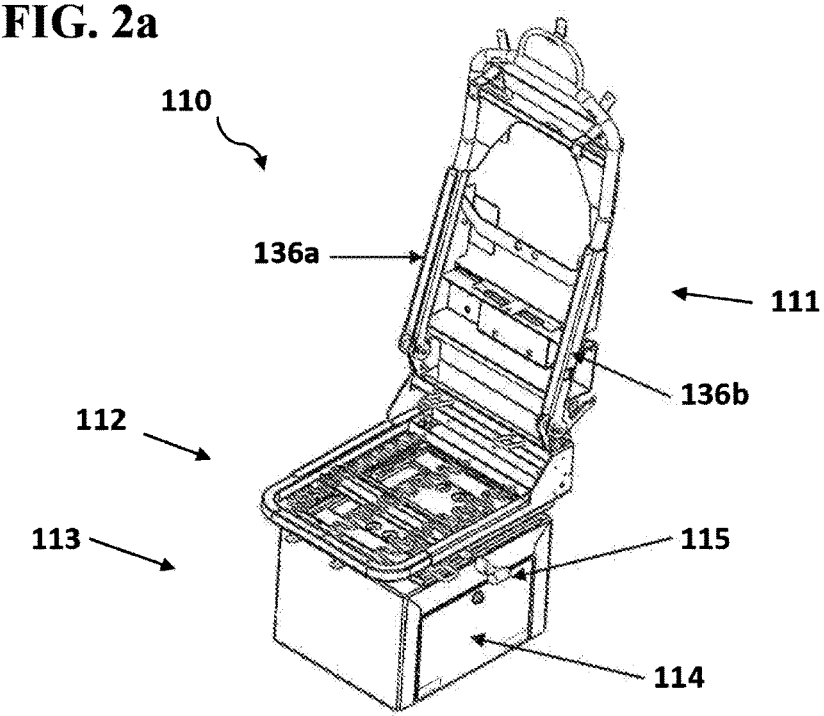
FIGS. 2a-2f are various views of one embodiment of the sideseat for use with the vehicle of FIGS. 1a and 1b.
Figure 2B:
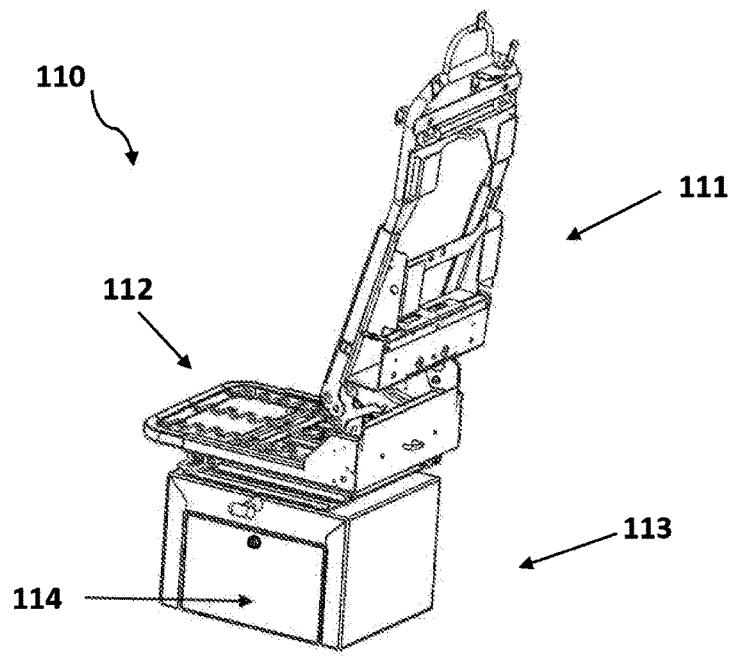
Figure 2C:
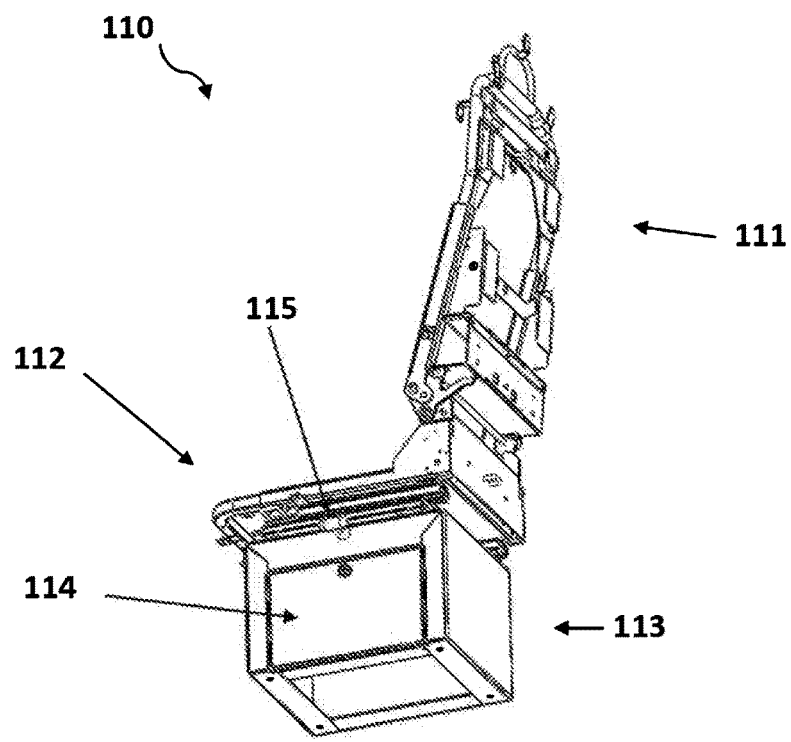
Figure 2D:
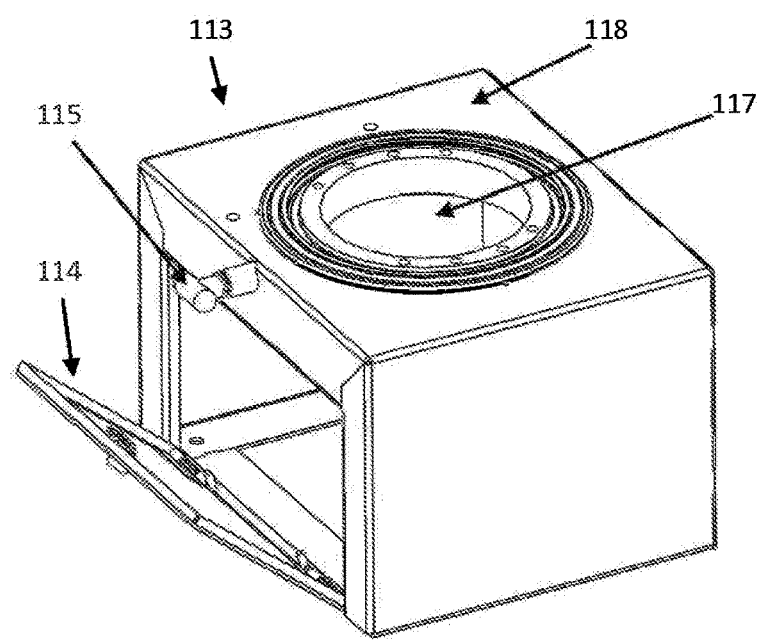
Figure 2E:
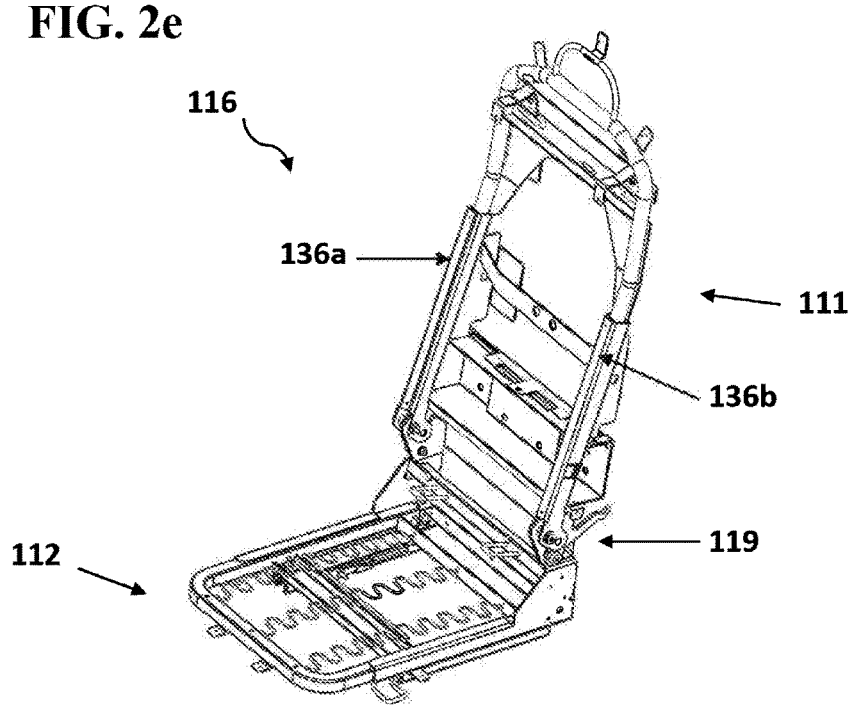
Figure 2F:
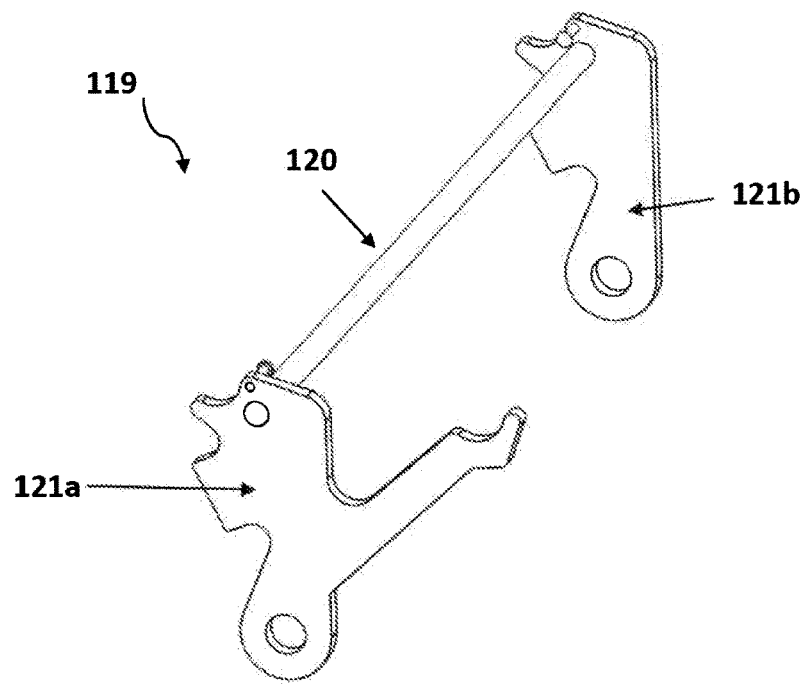
Figure 4A:
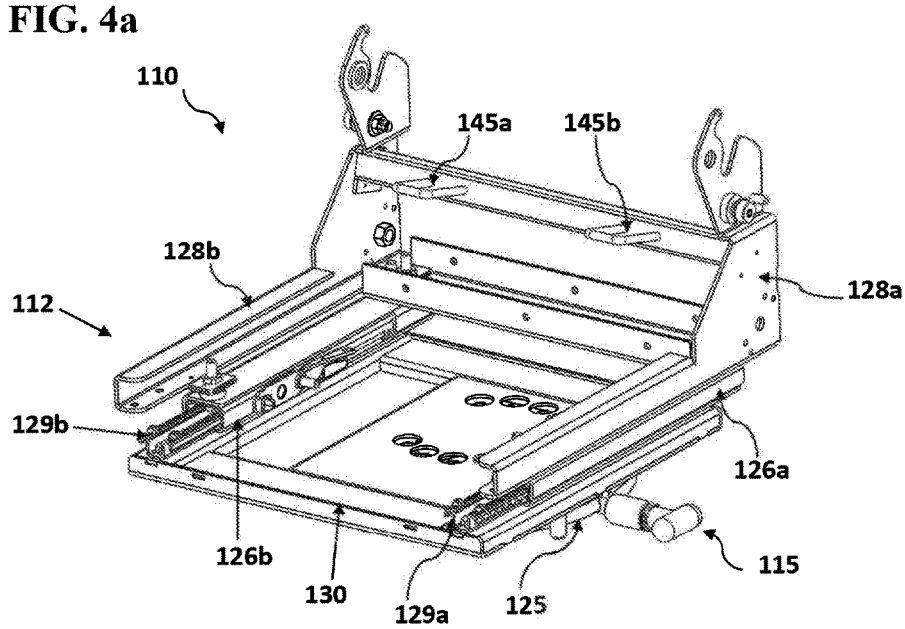
FIGS. 4a-4c are perspective views of the sideseat of FIGS. 2a-2f showing the sideseat posterior fame mounted off-center of a turntable.

In this embodiment, sideseat 110 includes a sideseat backrest frame 111 and sideseat posterior frame 112 as shown in FIG. 2*e*. Sideseat 110 further includes a plurality of anchor brackets 145 coupled to the sideseat posterior frame 112 (FIG. 4*a*). The sideseat backrest frame 111 includes upper frame members 136, which extend upwardly from posterior frame 112. As will be discussed in more detail below, the sideseat 110 further includes sideseat backrest cushion 122 which is carried by sideseat backrest frame 111, and sideseat posterior cushion 123 which is carried by sideseat posterior frame 112.

Figure 3A:
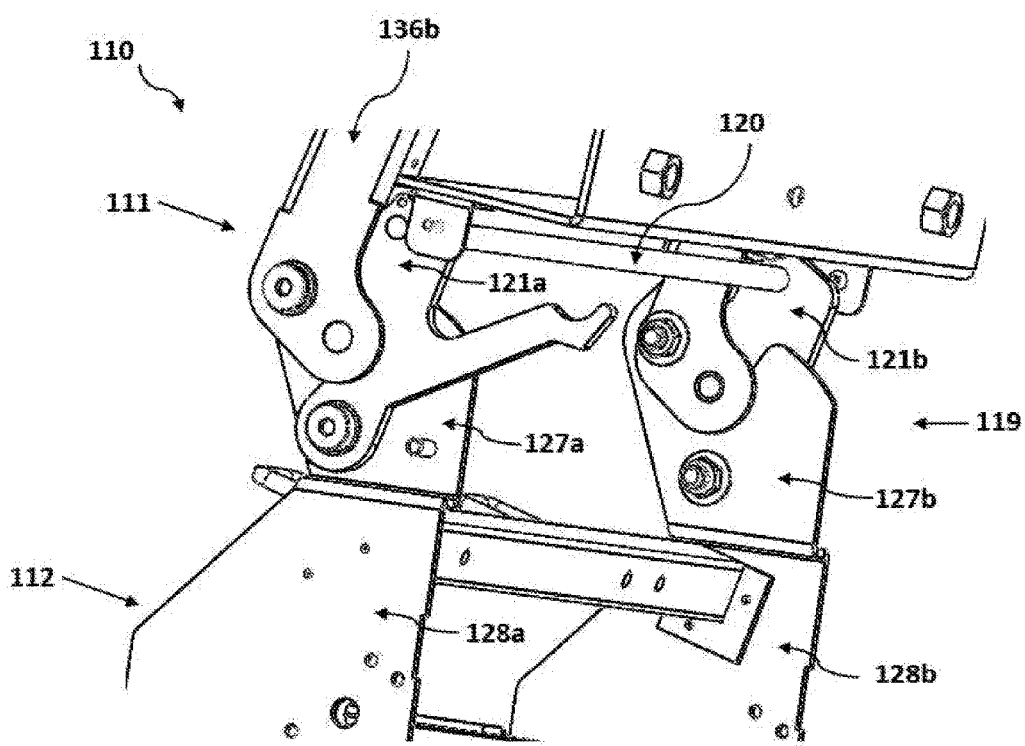
FIGS. 3a and 3b are close-up views of a sideseat backrest frame and sideseat posterior frame of the sideseat of FIGS. 2a-2f.
Figure 3B:
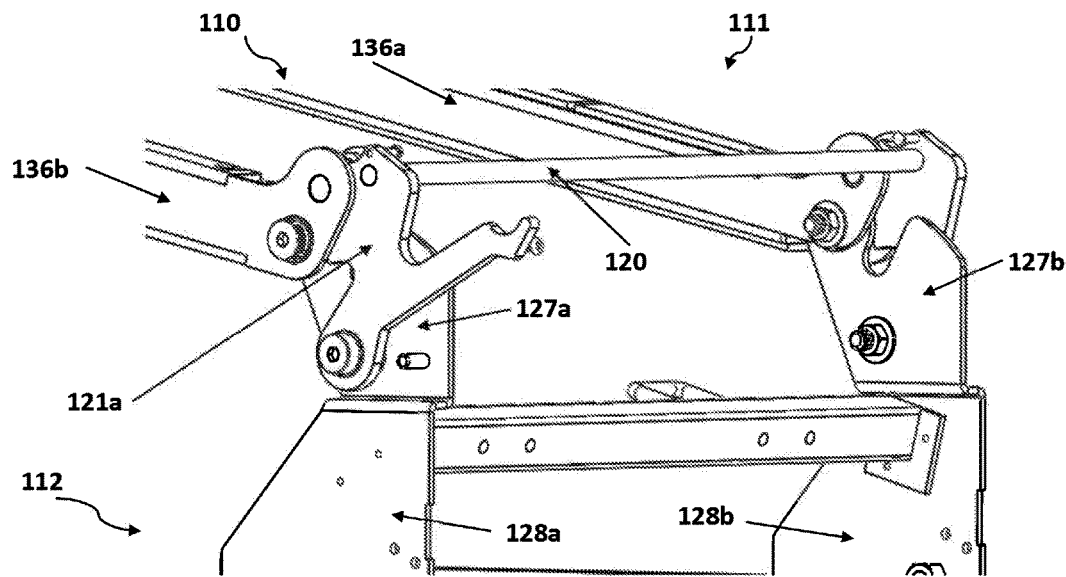

In this embodiment, sideseat posterior frame 112 includes a plurality of folding support brackets 127 and a plurality of posterior frame supports 128, as shown in FIG. 3a. Said folding support brackets 127 are each engaged with a first folding bracket 121 or a second folding bracket 221. Said first folding bracket 121 and said second folding bracket 221 are both engaged with sideseat backrest frame 111.

Sideseat backrest frame 111 and sideseat posterior frame 112 are capable of folding relative to each other, as shown in FIGS. 3a and 3b and FIGS. 8a and 8b. Sideseat backrest frame 111 and sideseat posterior frame 112 fold when they rotate relative to each other. In this embodiment, sideseat 110 includes a folding bracket assembly 119 (FIGS. 2e and 2f) which includes the first folding bracket 121 and the second folding bracket 221 which are coupled together by a folding bracket cross-bar 120. It should be noted that sideseat 110 includes an upper tether attachment bracket 146 coupled to sideseat backrest frame 111 (FIGS. 8a, 10a, 11, 12a and 12b).

In this embodiment, sideseat 110 includes a sideseat base 113 (FIG. 2d), which carries sideseat backrest frame 111 and sideseat posterior frame 112. Sideseat base 113 includes a sideseat base door 114. In this embodiment, sideseat posterior frame 112 is rotatably coupled to sideseat base 113. Sideseat posterior frame 112 is rotatably coupled to sideseat base 113 through a turntable 125.

Figure 4B:
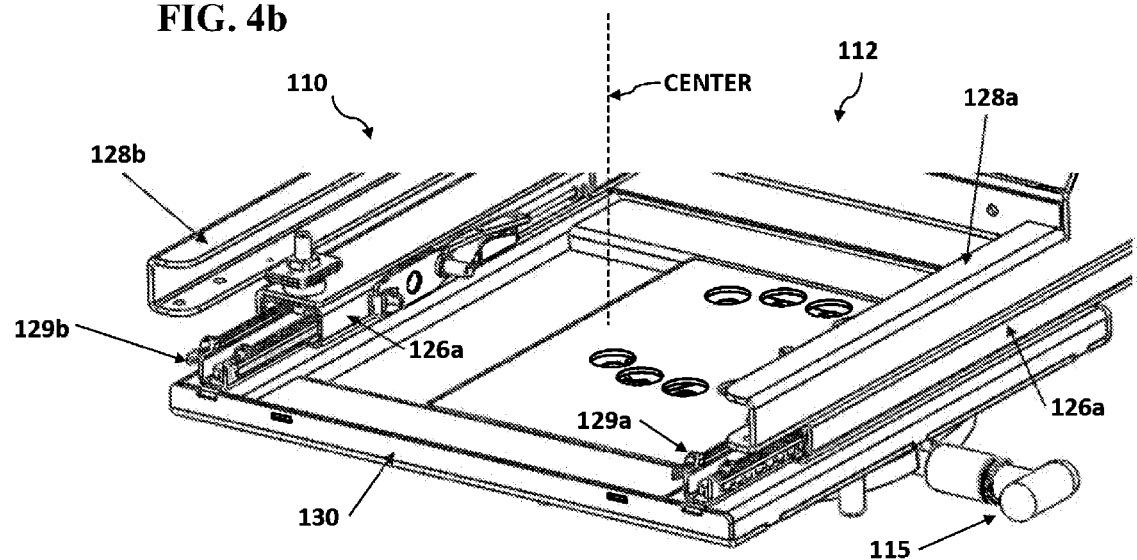
Figure 4C:
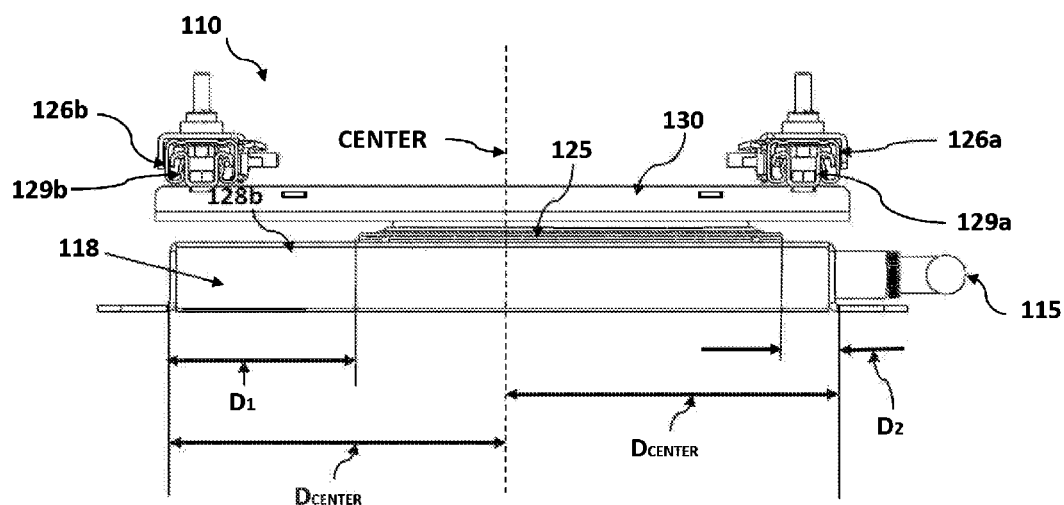

Turntable 125 is positioned proximate to a sideseat base opening 117 (FIG. 2d). Sideseat base opening 117 and turntable 125 are positioned centered in upper sideseat base wall 118. Turntable 125 is coupled to sideseat posterior frame 112 at a position centered to sideseat posterior frame 112, as shown in FIGS. 5a, 5b, 7b, 8b, 9b and 10b. In FIGS. 4a, 4b, 4c, the sideseat 110 is mounted off-center of turntable 125.

As shown in FIG. 4c, turntable 125 is mounted off-center of sideseat base 113 because distances $D_1$ and $D_2$ are unequal. In particular, turntable 125 is mounted off-center of upper sideseat base wall 118 because distances $D_1$ and $D_2$ are unequal. Distances $D_1$ and $D_2$ are equal when turntable 125 is center mounted on sideseat base 113.

As shown in FIGS. 4a and 4b, sideseat posterior frame 112 is mounted off-center of turntable 125 because a center of sideseat posterior frame 112 is not aligned with a center of turntable 125. In particular, sideseat posterior frame 112 is mounted off-center of turntable 125 because a center of a support plate 130 is not aligned with a center of turntable 125. The center of sideseat posterior frame 112 is denoted as the distance $D_{Center}$, and is indicated in FIGS. 4b and 4c.

Figure 5A:
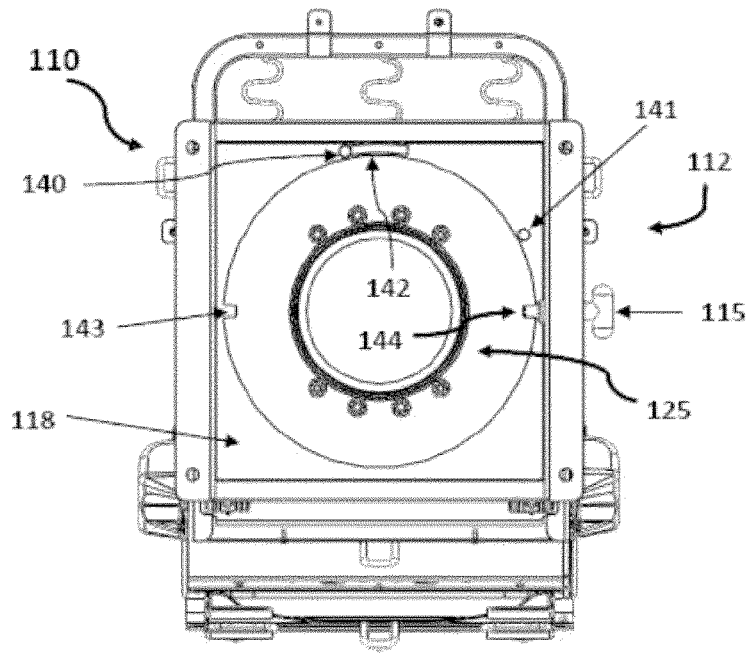
FIGS. 5a and 5b are top views of the sideseat of FIGS. 2a-2f showing the notches and protrusion of the turntable in both swivel locked and swivel deployed positions.
Figure 5B:
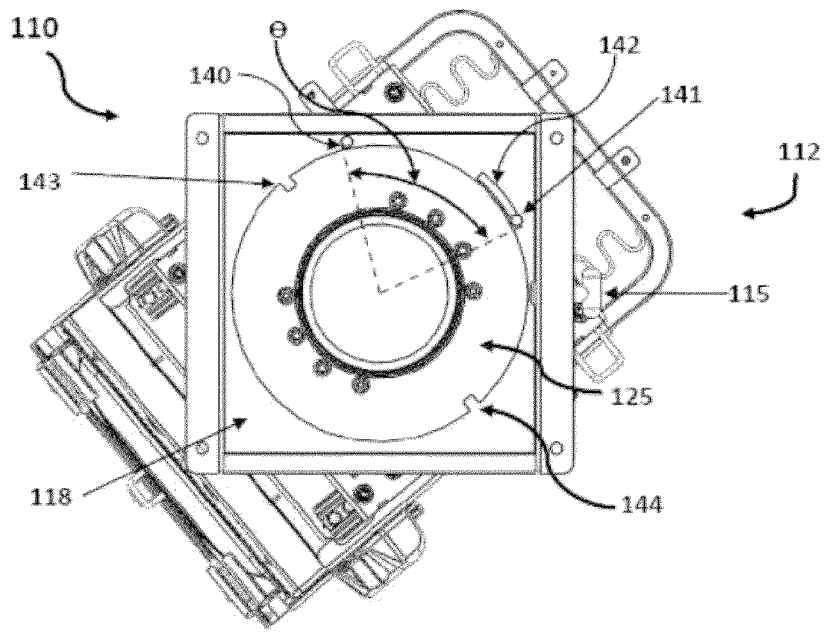
Figure 6A:
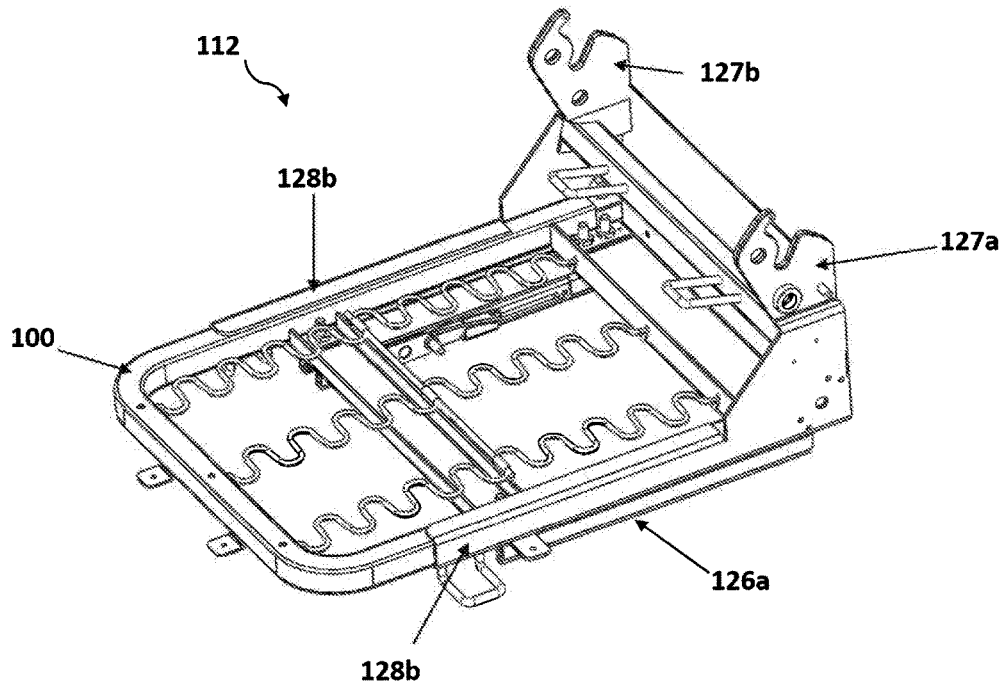
FIG. 6a is a perspective view of a sideseat posterior frame.
Figure 6B:
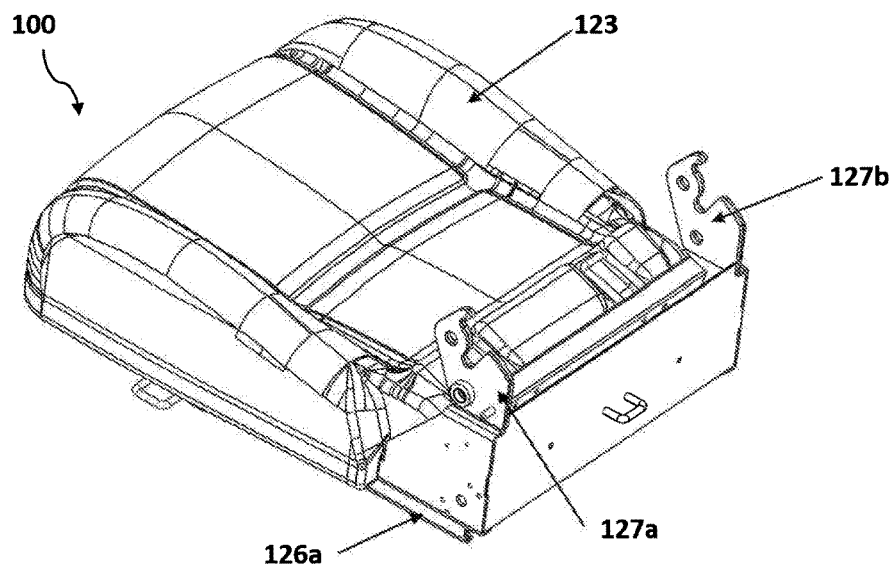
Figure 7A:
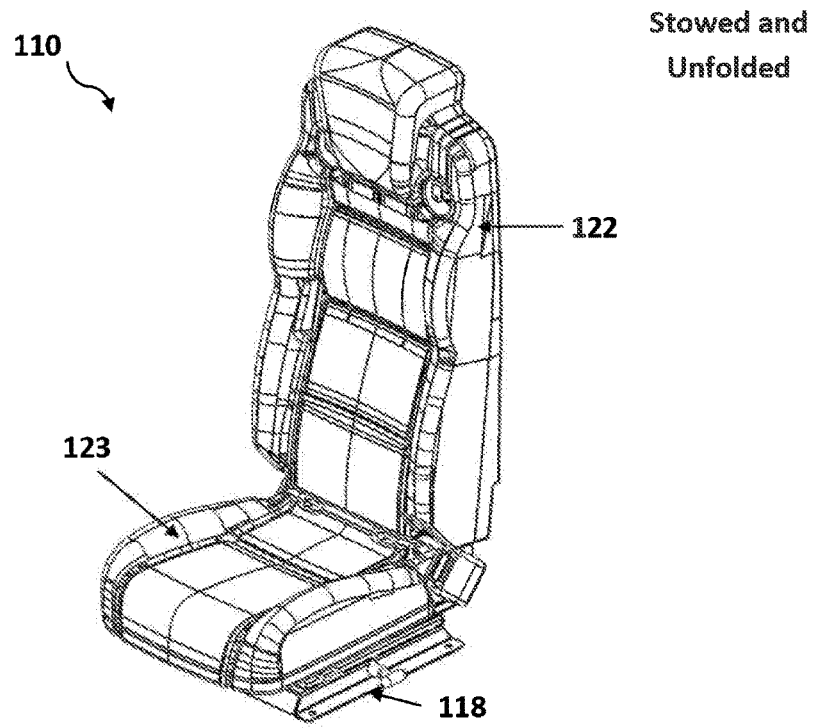
FIGS. 7a and 7b are perspective top and bottom views, respectively, of the sideseat in swivel locked and back unfolded conditions.
Figure 7B:
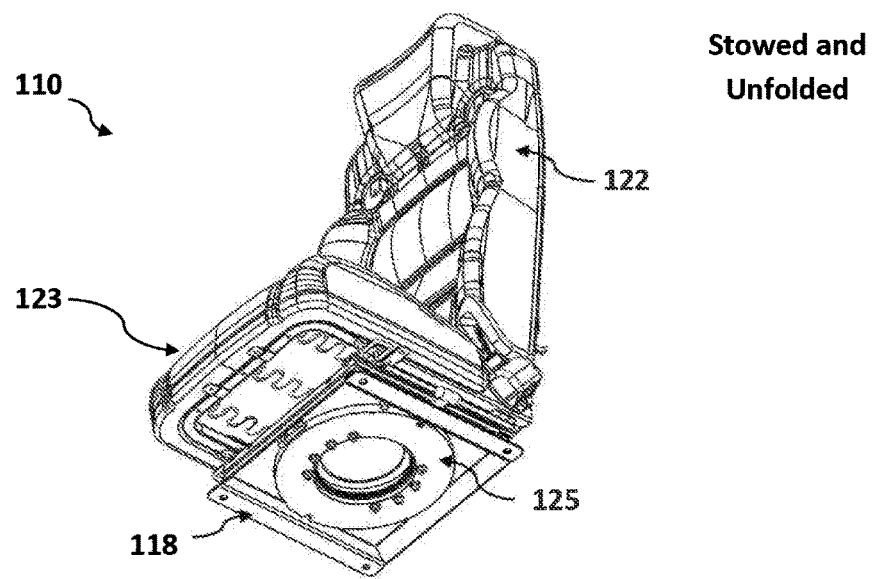
Figure 8A:
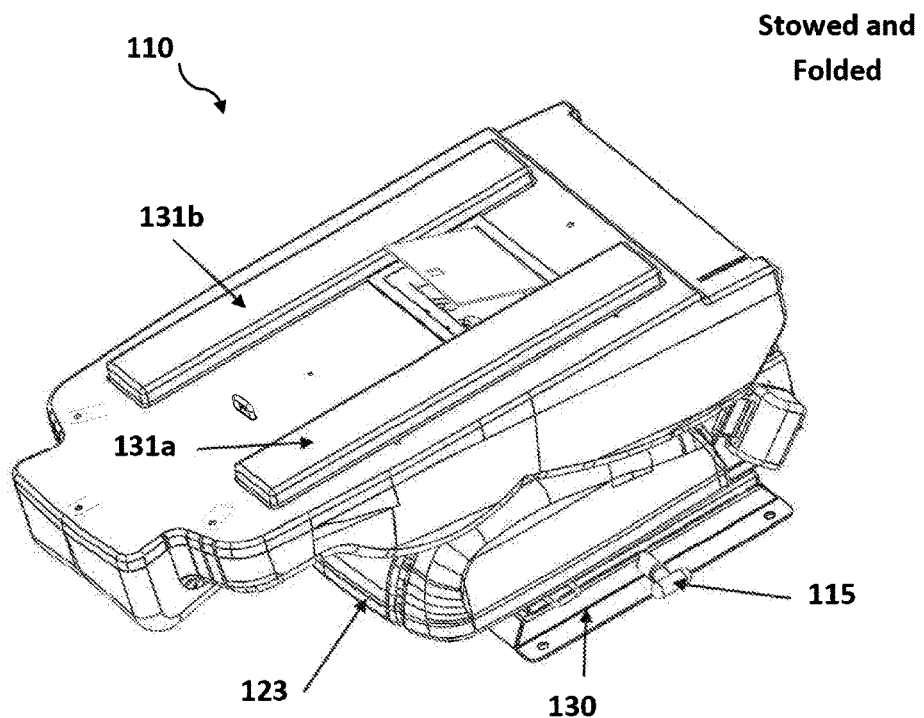
FIGS. 8a and 8b are perspective top and bottom views, respectively, of the sideseat in swivel locked and back folded conditions.
Figure 8B:
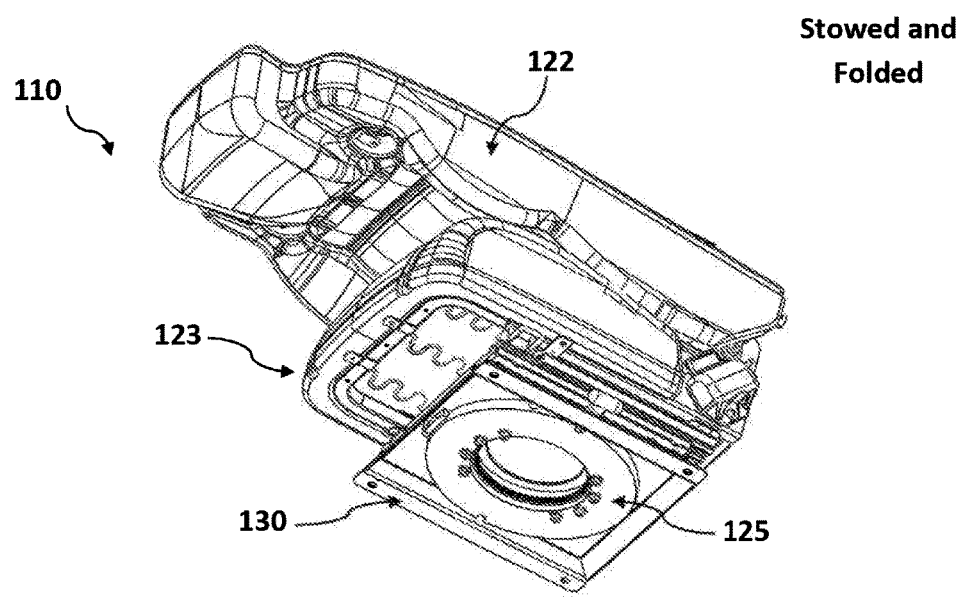
Figure 9A:
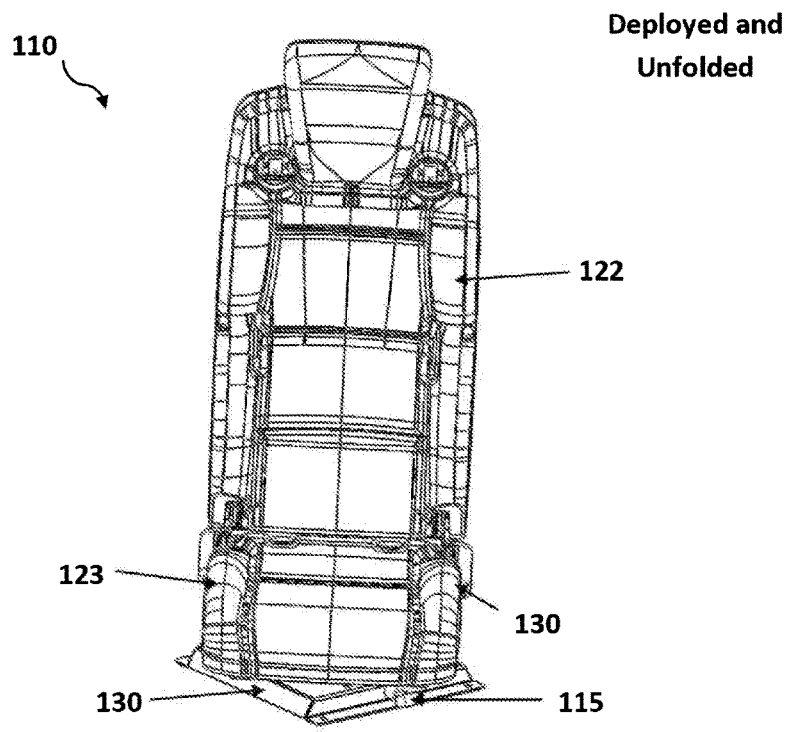
FIGS. 9a and 9b are perspective top and bottom views, respectively, of the sideseat in swivel deployed and back unfolded conditions.
Figure 9B:
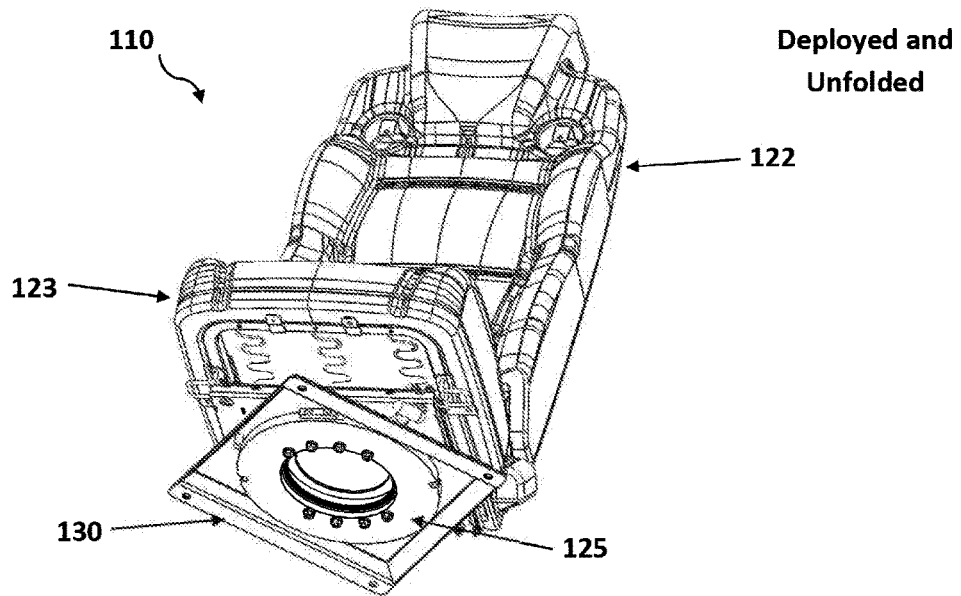
Figure 10A:
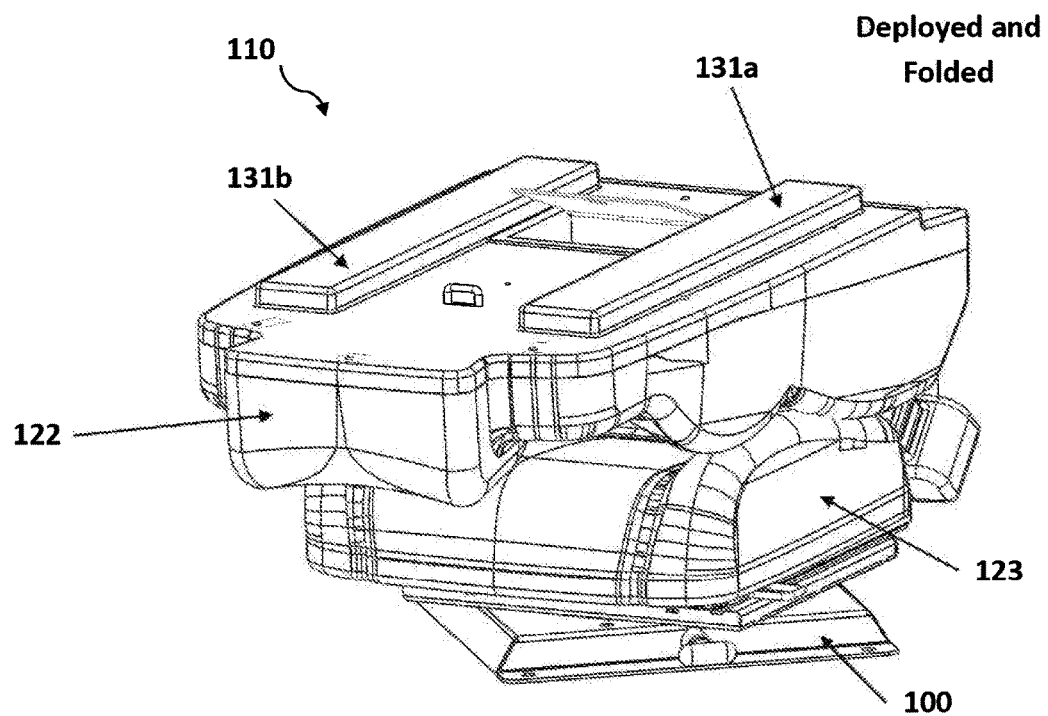
FIGS. 10a and 10b are perspective top and bottom views, respectively, of the sideseat in swivel deployed and back folded conditions.
Figure 10B:
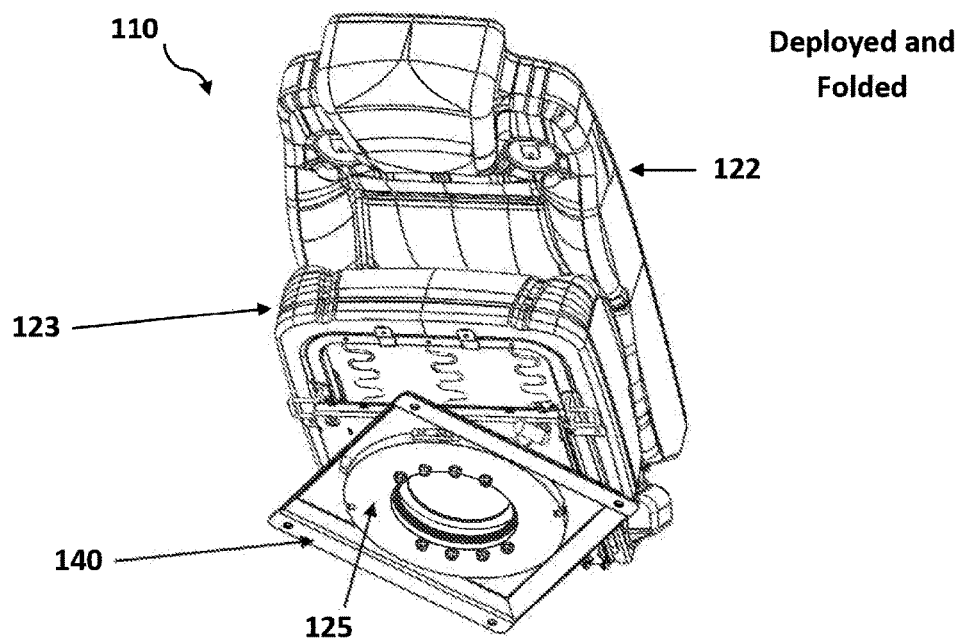

Turntable 125 includes notches 143 and 144, as well as protrusion 142, as shown in FIGS. 5a and 5b. Notches 143 and 144 are spaced apart from each other by 180° so that sideseat 110 can be positioned in stretcher compartment side seat region 104. In this embodiment, sideseat 110 includes backrest support rails 131 (FIGS. 8a and 10a), which are carried by sideseat backrest frame 111.

In the preferred embodiment, Sideseat 110 includes two upper slide rails 126 and two lower slide rails 129. Lower slide rails 129 are carried by a support plate 130 and upper slide rails 126 are coupled to posterior frame supports 128. It should be noted that turntable 125 is positioned at a location off-center of support plate 130, as shown in FIGS. 4a, 4b and 4c. Turntable 125 is mounted off-center of support plate 130 to facilitate the ability of support plate 130 to rotate from the deployed position to the locked position in response to the force applied to vehicle 100. Upper slide rails 126 are slidingly engaged with lower slide rails 129 so that posterior frame sideseat posterior frame 112 can slide relative to sideseat base 113.

Sideseat 110 includes a locking mechanism 115, which extends through upper sideseat base wall 118. Locking mechanism 115 is capable of extending through notch 144. Turntable 125 is restricted from rotating in response to locking mechanism 115 extending through notch 144. Sideseat 110 is locked in the locked position in response to locking mechanism extending through notch 144, as shown in FIG. 5a. Locking mechanism does not extend through notch 144 when sideseat 110 is in the deployed position, as shown in FIG. 5b.

Protrusion 142 is rotatably moveable between stop pins 140 and 141. Sideseat 110 is in the locked position when protrusion 142 is proximate to pin 140 and away from pin 141. Further, sideseat 110 is in the deployed position when protrusion 142 is proximate to pin 141 and away from pin 140.

It should be noted that the angle θ between pins 140 and 141 is chosen to allow sideseat frame to rotate a desired angle relative to sideseat base 113. In this embodiment, angle θ between pins 140 and 141 is about 50° so that sideseat frame is allowed to rotate about 50° relative to sideseat base 113. In some embodiments, angle θ between pins 140 and 141 is in a range between about 30° to about 80° so that sideseat frame is allowed to rotate between about 30° to about 80° relative to sideseat base 113.

Figure 11:
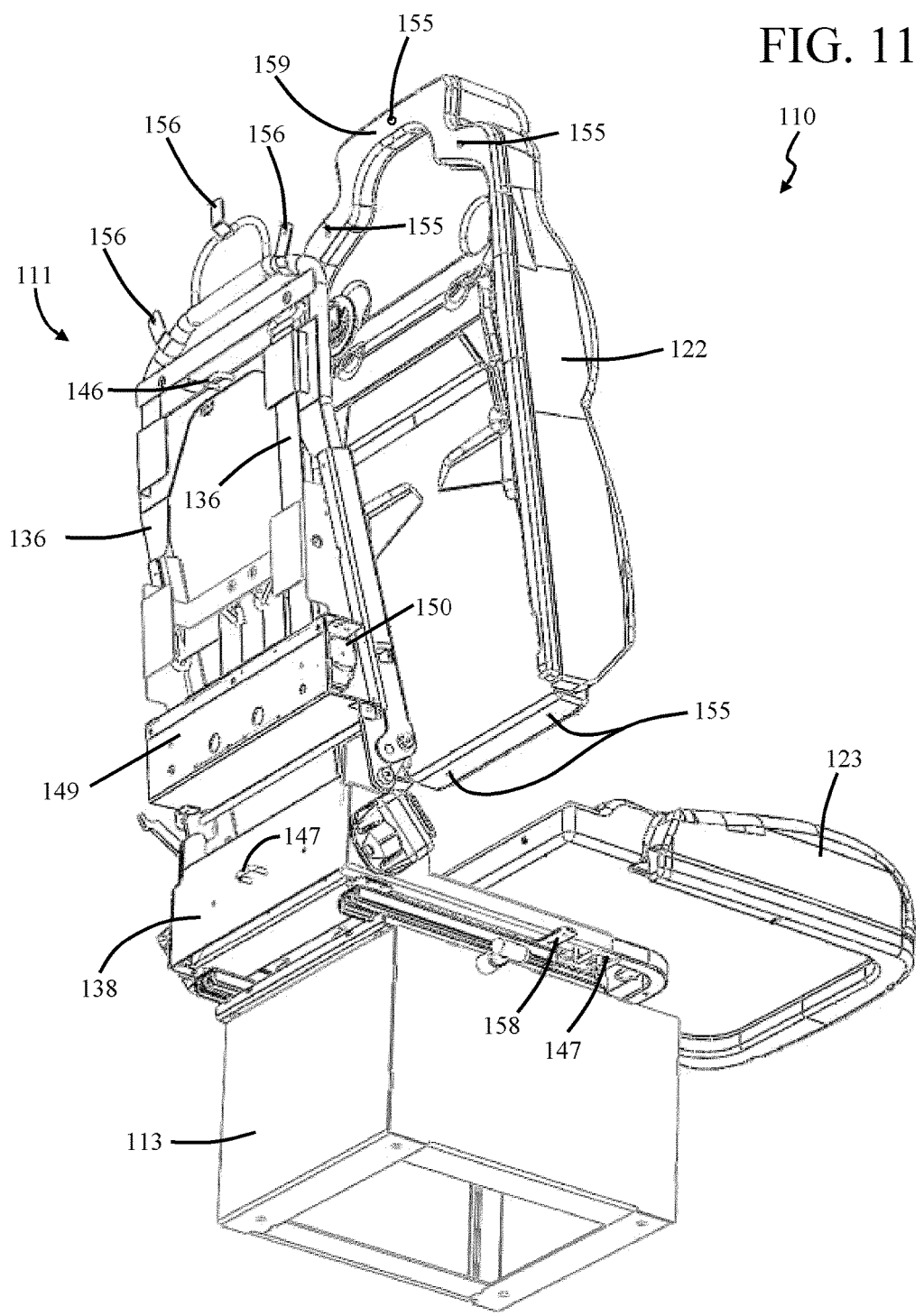
FIG. 11 is an exploded rear perspective view of another embodiment of a sideseat.

Sideseat 110 includes a molded foam process where the thickness and durometer of the external "skin" can be carefully controlled, as well as the thickness and density of the internal foam. Internal structural components are completely encapsulated in the foam without any sewn or open seams. This combination of a sealed, durable and seamless "skin" combined with encapsulated internal structures allow sideseat 110 to effectively address the issues outlined above that are a concern for emergency, military and service vehicles. The fully encapsulated system 122 and 123 (FIG. 11) yields the only true seamless upholstery, and is very easy to clean and disinfect. Since it is not stretched over an underlying foam layer, the external "skin" does not gape or pull apart when punctured, and is easily repaired with any cyanoacrylate glue. The sideseat 110 upholstery may be quickly changed in the field using simple tools without the seat being removed from the vehicle. This capability is made possible by the ability to encapsulate metal inside the foam substrate. Nut plates are suspended and encapsulated within the foam, while still allowing access to the threads 155 and 157 (FIG. 11). This allows for a simple bolt on-bolt off installation and removal of the upholstery component as a complete unit.

In this embodiment, sideseat 110 includes three backrest tabs 156 carried by sideseat backrest frame 111. Further, sideseat 110 includes three backrest cushion frame openings 155 which extend through a sideseat backrest cushion frame 159. Sideseat backrest cushion frame 159 carries sideseat backrest cushion 122. Sideseat backrest cushion frame 159 is repeatably moveable between fastened and unfastened conditions with sideseat backrest frame 111. In the fastened condition, backrest tabs 156 are aligned with backrest cushion frame openings 155. A first fastener (not shown) is extended through backrest tab 156 and backrest cushion frame opening 155 so that backrest tab 156 is fastened to sideseat backrest cushion frame 159 in response. A second fastener (not shown) is extended through backrest tab 156 and backrest cushion frame opening 155 so that backrest tab 156 is fastened to sideseat backrest cushion frame 159 in response. A third fastener (not shown) is extended through backrest tab 156 and backrest cushion frame opening 155 so that backrest tab 156 is fastened to sideseat backrest cushion frame 159 in response. In this way, sideseat backrest cushion frame 159 is fastened with sideseat backrest frame 111.

Figure 12A:
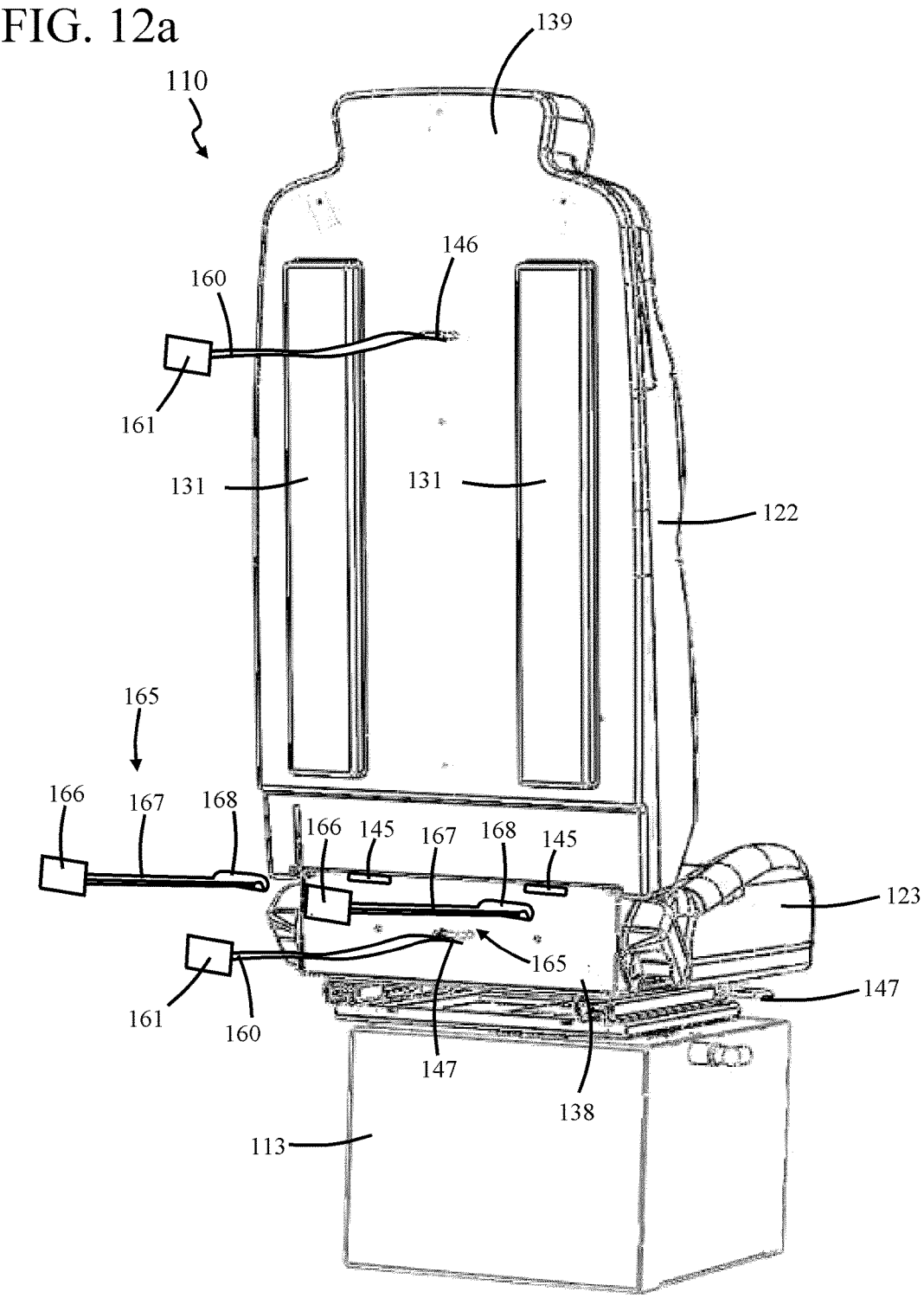
FIG. 12a is a rear perspective view of the sideseat of FIG. 11 in a swivel locked and back unfolded condition showing child seat tether mount.
Figure 12B:
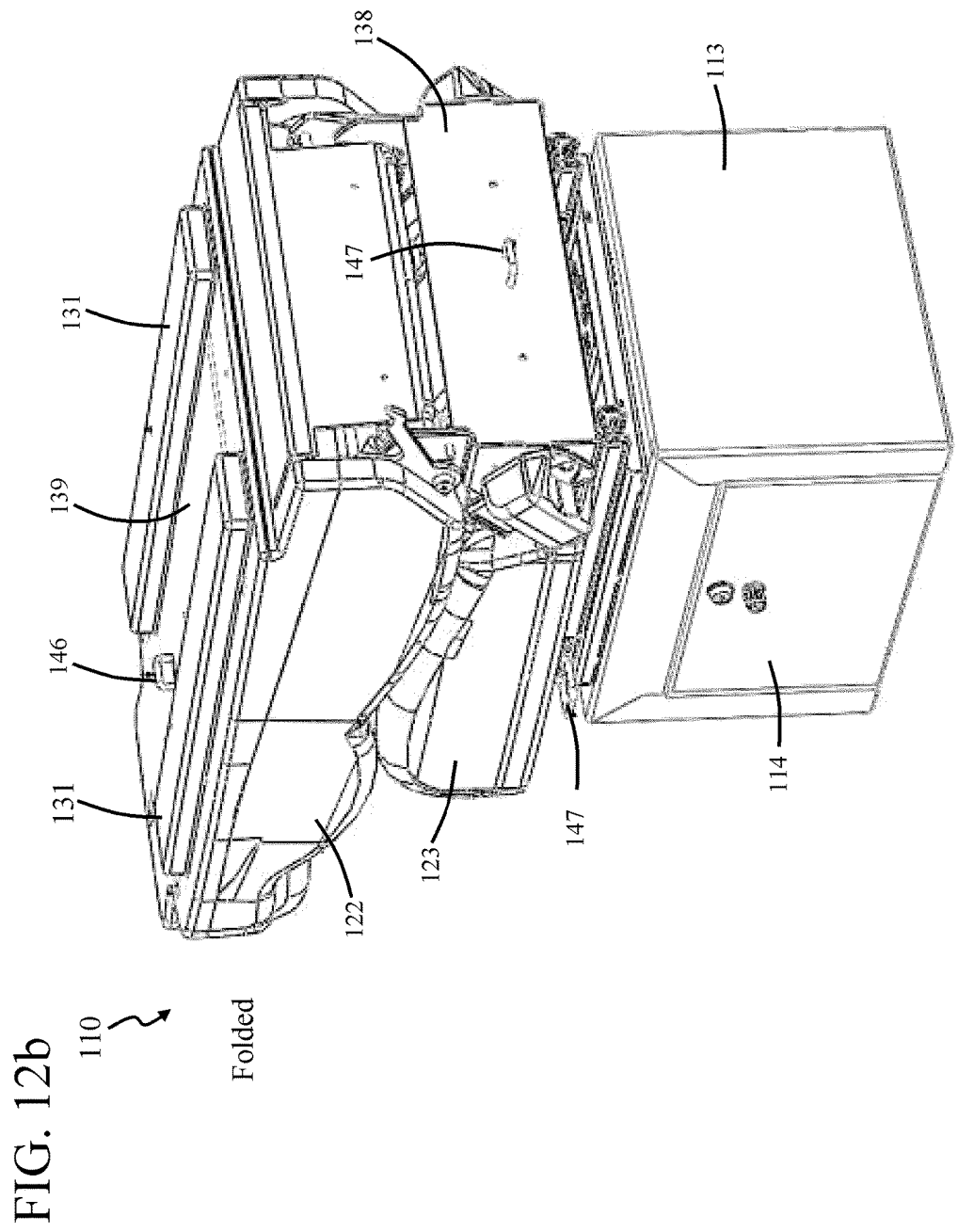
FIG. 12b is a rear perspective view of the sideseat of FIG. 11 in a swivel locked and back folded position ready to support a backboard.

The first fastener (not shown) is removed from backrest tab 156 and backrest cushion frame opening 155 so that backrest tab 156 is unfastened from sideseat backrest cushion frame 159 in response. A second fastener (not shown) is removed from backrest tab 156 and backrest cushion frame opening 155 so that backrest tab 156 is unfastened to sideseat backrest cushion frame 159 in response. A third fastener (not shown) is removed from backrest tab 156 and backrest cushion frame opening 155 so that backrest tab 156 is unfastened to sideseat backrest cushion frame 159 in response. In this way, sideseat backrest cushion frame 159 is unfastened with sideseat backrest frame 111. In this embodiment, sideseat 110 includes a lower backrest plate 138 with a lower tether attachment bracket 147 coupled thereto. FIG. 12a is a rear perspective view of sideseat 110 in a locked and unfolded condition, and FIG. 12b is a rear perspective view of sideseat 110 in a locked and folded condition.

Sideseat 110 is designed to fold and provide adequate structural support for cots and back boards. It has raised areas incorporated into the backrest support rails 131 (FIGS. 12a and 12b) to provide support for the "runners" commonly found on back boards. It also has lower tether attachment bracket 147 (FIGS. 12a and 12b) for the sides and end of the back board or cot. These are designed to accommodate the standard "quick clip" type of hardware readily available on straps from many manufacturers. In this embodiment, sideseat 110 includes backrest support rails 131 which are carried by an upper backrest plate 139.

FIG. 13 is a perspective front of the sideseat 110 showing an integrated retractor and restraint system. Typical vehicle seats with integrated seat belts have the retractors for the restraint system mounted on the base or lower frame due to the greater structural strength found in those components. While it is possible for this design to function well in a seat with a fixed back, it can create problems in a seat with a folding back because of the extra belt travel required for the seat to fold. This can directly impede the seats ability to fold and also interfere with the retractors ability to lock when loaded.

Sideseat 110 incorporates a unique system of internal retractors 150 (FIG. 13) in a housing 149 (FIGS. 11 and 13) inboard to the frame that allow all the upper harness system components to function independently of any permanent attachments to the lower seat or base. The unique design of the sideseat 110 allows the retractors to be integrated while retaining the ability to easily replace them if necessary.

It should be noted that side seat 110 can be configured so that it does not swivel. One way to configure side seats 110 so it does not swivel is to remove turntable 125 (FIG. 5a). Sideseat backrest frame 111 and sideseat base 113 are restricted from rotating relative to each other when turntable 125 is removed from side seat 110. Another way to configure side seat 110 so it does not swivel is to use locking mechanism 115. In this way, side seat 110 can be used as a forward facing or rear facing seat.

It is useful to use side seat 110 as a forward facing and/or rear facing seat so that it can be used as a child and infant seat. It can be appreciated that it is undesirable, for safety reasons, to have side seat 110 swivel when being used as a child and infant seat.

Figure 14:
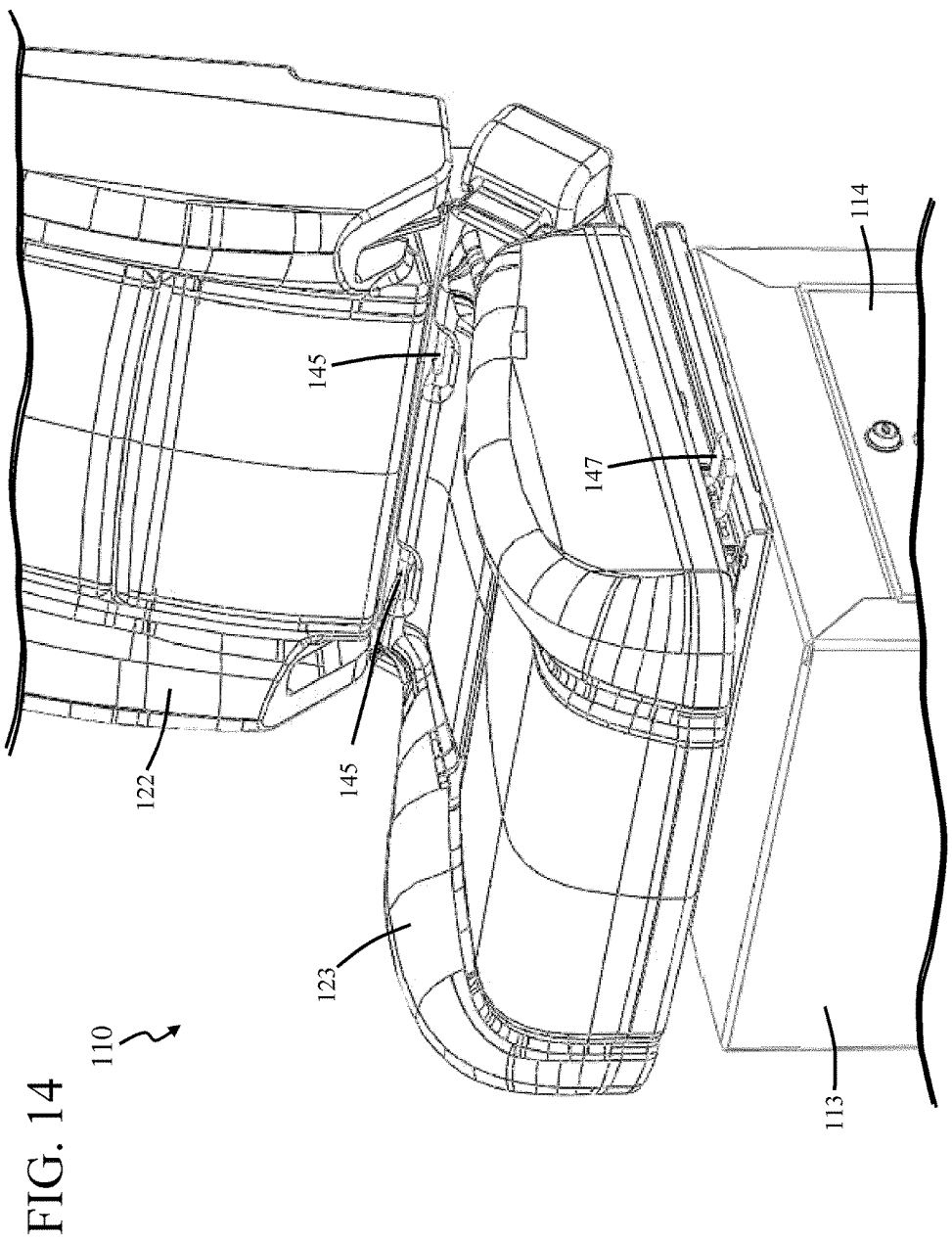
FIG. 14 is a perspective front view showing integrated lower child seat attachments (145a & 145b).

It is also useful to use side seat 110 as forward facing or rear facing seats so that side seat 110 is adaptable for use with safety systems such as the familiar passenger car system of LATCH (Lower Anchors and Tethers for CHildren). Accordingly, sideseat 110 includes anchor brackets 145, as shown in FIGS. 4a, 12a and 14, as well as upper tether attachment bracket 146 and lower tether attachment bracket 147 (FIGS. 12a and 12b) that are physically compatible with the hardware found on standard child seats. Other than those basic physical similarities the design and engineering are specific to the intended use in an emergency vehicle setting. Both latch and tether anchors are designed to accommodate the loads generated by an 80 lb. child. The plurality of anchor brackets 145 form an integrated system with the structure sideseat 110 and are specifically designed to function in both a forward-facing and rear-facing configuration. They are engineered to produce FMVSS 213 compliant head and chest injury scores using Hybrid III ATDs even when dynamically tested to the more violent ambulance-specific SAE J2917 crash test pulse. In this embodiment, and as best seen in FIG. 12a, a tether 160 is coupled to upper tether attachment bracket 146 at one end in a repeatably removable manner, and to a child seat at an opposed end. In this embodiment, and as best seen in FIG. 14, a child seat can be attached by its lower anchor straps and clips to anchor brackets 145 in a repeatedly removable manner.

In the preferred embodiment, sideseat 110 includes a plurality of internally-located emergency locking retractors 150 (FIG. 13) in a housing 149 (FIG. 13) inboard to the frame of said sideseat 110 that allow all the upper harness system components to function independently of any permanent attachments to the lower seat or base. The unique design of sideseat 110 is configured to enable the emergency locking retractors to be integrated while retaining the ability to easily replace them if necessary.

Sideseat 110 utilizes a molded foam process where the thickness and durometer of the external "skin" can be carefully controlled, as well as the thickness and density of the internal foam. Internal structural components are completely encapsulated in the foam without any sewn or open seams. This combination of a sealed, durable and seamless "skin" combined with encapsulated internal structures allow the sideseat 110 to effectively address the issues outlined above that are a concern for emergency, military and service vehicles. The fully encapsulated system 122 and 123 (FIG. 11) yields the only true seamless upholstery, and is very easy to clean and disinfect. Since it is not stretched over an underlying foam layer, the external "skin" does not gape or pull apart when punctured, and is easily repaired with any cyanoacrylate glue. Sideseat 110 upholstery may be quickly changed in the field using simple tools without the seat being removed from the vehicle. This capability is made possible by the ability to encapsulate metal inside the foam substrate. Nut plates are suspended and encapsulated within the foam, while still allowing access to the threads 155 and 157 (FIG. 11). This allows for a simple bolt on-bolt off installation and removal of the upholstery component as a complete unit.

Sideseat 110 is designed to fold and provide adequate structural support for cots and back boards. It has raised areas incorporated into the backrest support rails 131 (FIGS. 12a and 12b) to provide support for the "runners" commonly found on back boards. It also has lower tether attachment bracket 147 (FIGS. 12a and 12b) for the sides and end of the back board or cot. These tether attachment brackets 147 are configured to accommodate the standard "quick clip" type of hardware readily available on straps from many manufacturers.

Sideseats 110 incorporate lower anchors 145 (FIG. 14) and upper tether attachment bracket 146 (FIGS. 12a and 12b) points that are physically compatible with the hardware found on standard child seats. Other than those basic physical similarities the design and engineering are specific to the intended use in an emergency vehicle setting. Both latch and tether anchors are designed to accommodate the loads generated by an 80 lb. child. The latch and tether anchors form an integrated system with the structure of the seat frame in sideseat 110 and are specifically designed to function in both a forward-facing and rear-facing configuration. They are engineered to produce FMVSS 213 compliant head and chest injury scores using Hybrid III ATDs even when dynamically tested to the more violent ambulance specific SAE J2917 crash test pulse.

Certain additional components of the preferred embodiment of the sideseat 110 will be known to those skilled in the art. These components include a sidewall mounting bracket 166, a tether sidewall mounting bracket 161, and anchor bracket latch assembly 165, a latch arm 167, a latch 168, a belt redirector 154, and other components not named.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. A sideseat for use in a vehicle, comprising:
a sideseat base, said sideseat base further comprising an upper sideseat base wall and a sideseat base opening, said sideseat base opening extending through the upper sideseat base wall;
a turntable, either centered or positioned proximate to a side of the upper sideseat base wall;
a sideseat posterior frame rotatably coupled to the turntable through the sideseat base opening, wherein the turntable is either centered or positioned off-center relative to the sideseat base; and
a locking mechanism configured to return the sideseat to a forward-facing position relative to the vehicle in response to a reduction in speed by the vehicle, then to lock the sideseat in the forward-facing position.

2. The sideseat of claim 1, the locking mechanism further configured to lock the rotation of the turntable when aligned with the front of the vehicle in response to manual operation.

3. The sideseat of claim 1, further comprising a stop configured to restrict the rotation of the turntable to less than 90° of unilateral rotation from the locked preconfigured position.

4. The sideseat of claim 1, further comprising a non-locking stop configured to restrict the rotation of the turntable to less than 90° of unilateral rotation from the locked preconfigured position.

5. The sideseat of claim 1, further comprising a sideseat posterior cushion which is repeatably moveable between fastened and unfastened conditions with the sideseat posterior frame.

6. The sideseat of claim 1, wherein the sideseat posterior frame is positioned either centered or proximate to an opposed side of the upper sideseat base wall.

7. The sideseat of claim 1, further comprising two lower anchor bracket assemblies coupled to the sideseat posterior frame.

8. The sideseat of claim 1, further comprising a sideseat backrest frame which extends upwardly from the sideseat posterior frame.

9. The sideseat of claim 8, further comprising a sideseat backrest cushion which is repeatably moveable between fastened and unfastened conditions with the sideseat backrest frame.

10. The sideseat of claim 8, further comprising internal retractors carried by the sideseat backrest frame.

11. The sideseat of claim 8, further comprising internal belt angle redirectors carried by the sideseat backrest frame.

12. The sideseat of claim 8, further comprising backboard support rails carried by the sideseat backrest frame.

13. The sideseat of claim 8, further comprising a tether anchor coupled to the sideseat backrest frame.

14. The sideseat of claim 1, further configured such that the sideseat rotates to its preconfigured position in response to a collision by the vehicle.

15. The sideseat of claim 1, further configured such that the sideseat rotates to its preconfigured position in response to a head-on collision by the vehicle.

16. The sideseat of claim 1, in which the locking mechanism may be disengaged by manual operation.

* * * * *